(12) United States Patent
Tsutsumi

(10) Patent No.: US 10,353,643 B2
(45) Date of Patent: Jul. 16, 2019

(54) TOUCH OPERATION DEVICE, IMAGE FORMING APPARATUS AND METHOD OF RELEASING LOCK STATE OF TOUCH OPERATION DEVICE

(71) Applicant: KYOCERA Document Solutions Inc., Osaka (JP)

(72) Inventor: Masafumi Tsutsumi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/013,518

(22) Filed: Jun. 20, 2018

(65) Prior Publication Data

US 2018/0373467 A1  Dec. 27, 2018

(30) Foreign Application Priority Data

Jun. 22, 2017 (JP) .................. 2017-122179
Oct. 12, 2017 (JP) .................. 2017-198404

(51) Int. Cl.
| | |
|---|---|
| G06F 3/12 | (2006.01) |
| G06F 3/0481 | (2013.01) |
| G06F 3/0488 | (2013.01) |
| G06F 3/041 | (2006.01) |
| H04N 1/12 | (2006.01) |
| G06F 21/36 | (2013.01) |

(52) U.S. Cl.
CPC .......... *G06F 3/1201* (2013.01); *G06F 3/0412* (2013.01); *G06F 3/04817* (2013.01); *G06F 3/04883* (2013.01); *G06F 21/36* (2013.01); *H04N 1/121* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 2012/0200515 | A1* | 8/2012 | Yamada ................ | G06F 1/1626 345/173 |
| 2014/0292693 | A1* | 10/2014 | Kitai ...................... | G06F 21/36 345/173 |
| 2016/0042171 | A1* | 2/2016 | Murai .................... | G06F 21/36 726/19 |

FOREIGN PATENT DOCUMENTS

JP    2014-222392 A    11/2014

* cited by examiner

*Primary Examiner* — Ngon B Nguyen
(74) *Attorney, Agent, or Firm* — Stein IP, LLC

(57) ABSTRACT

A touch operation device displays a lock release screen on a touch screen. The lock release screen includes a plurality of guides which are arranged according to a predetermined rule and a plurality of symbols which are arranged around the guides. One of the guides is set to a start guide. Release symbols are arranged around the start guide. The touch operation device releases lock state when the first guide of an input pattern agrees with the start guide and the shape of the input pattern agrees with the shape of a release pattern.

13 Claims, 20 Drawing Sheets

TOUCH OPERATION DEVICE, IMAGE FORMING APPARATUS AND METHOD OF RELEASING LOCK STATE OF TOUCH OPERATION DEVICE

INCORPORATION BY REFERENCE

This application is based upon and claims the benefit of priority from the corresponding Japanese Patent Application No. 2017-122179 filed on Jun. 22, 2017 and the corresponding Japanese Patent Application No. 2017-198404 filed on Oct. 12, 2017, the entire contents of which are incorporated herein by reference.

BACKGROUND

The present disclosure relates to a touch operation device which recognizes an input pattern so as to release lock state and an image forming apparatus which includes such a touch operation device. The present disclosure also relates to a method of recognizing an input pattern so as to release lock state.

There are electronic devices which have lock mechanisms for preventing the operations of persons who are not authorized and other people (unauthorized use). Lock mechanisms which use characters (password) are conventionally known. In recent years, electronic devices which include touch panels have been increasingly available. In the electronic devices which include touch panels, the lock mechanism of a pattern lock method is increasingly adopted. In the pattern lock method, a trace (pattern) which is obtained by tracing points displayed on the touch panel is checked against a previously registered pattern, and when they agree with each other, the lock state is released.

In this method, when the lock state is released, a user draws a pattern on the touch panel with a finger. Hence, a drawing mark caused by the sebum of the finger or the like may be left on the touch panel. Based on the drawing mark, a person who is not authorized to use the electronic device may release the pattern lock.

An electronic device is proposed which can prevent a drawing mark from being left on a touch panel. In this electronic device, the touch panel is used which detects (reacts with) a finger of a user without making contact therewith. In a state where the finger is separated from the touch panel, a drawn pattern is recognized. With the touch panel which can detect the finger of the user in a noncontact manner, the fingerprint of the finger of the user and the sebum of the finger are not left (drawing mark is not left). In this electronic device, the lock state is unlikely to be released by a person (unauthorized) who do not know the pattern.

However, in the electronic device described above, the position and the direction of the pattern on the touch panel are constantly the same. A release pattern for the lock state can be estimated from the movement of the finger of the user when the pattern is input. A person who is not authorized may release the lock state.

SUMMARY

A touch operation device according to the present disclosure includes a lock control portion, an image generation portion, a touch screen and a storage portion. The lock control portion controls an operation of lock state and lock release that is a predetermined function. The image generation portion generates a lock release screen for the lock release. The touch screen displays the generated lock release screen and can detect a touch operation. The storage portion stores a release pattern which is previously registered and release symbols in which a plurality of symbols are combined. The image generation portion includes a plurality of guides in the lock release screen. The image generation portion arranges the guides according to a predetermined rule. The image generation portion includes a plurality of symbols in the lock release screen. The image generation portion arranges the symbols around the guides at regular intervals. The image generation portion includes one of the guides which is set to a start guide in the lock release screen. The image generation portion generates the lock release screen in which the release symbols are arranged around the start guide. The lock control portion acquires an input pattern which is a trace of the touch operation of connecting the guides together. The lock control portion releases the lock state when the lock control portion confirms that in the input pattern, the guide on which the touch operation is first performed agrees with the start guide and that the shape of the input pattern agrees with the shape of the release pattern.

Further features and advantages of the present disclosure will become more apparent from an embodiment described below.

DETAILED DESCRIPTION

A touch operation device according to an embodiment and a device which includes such a touch operation device will be described below with reference to drawings. Individual elements such as configurations and arrangements described in the present disclosure do not limit the scope of the disclosure, and are simply illustrative examples.

Figure 1:
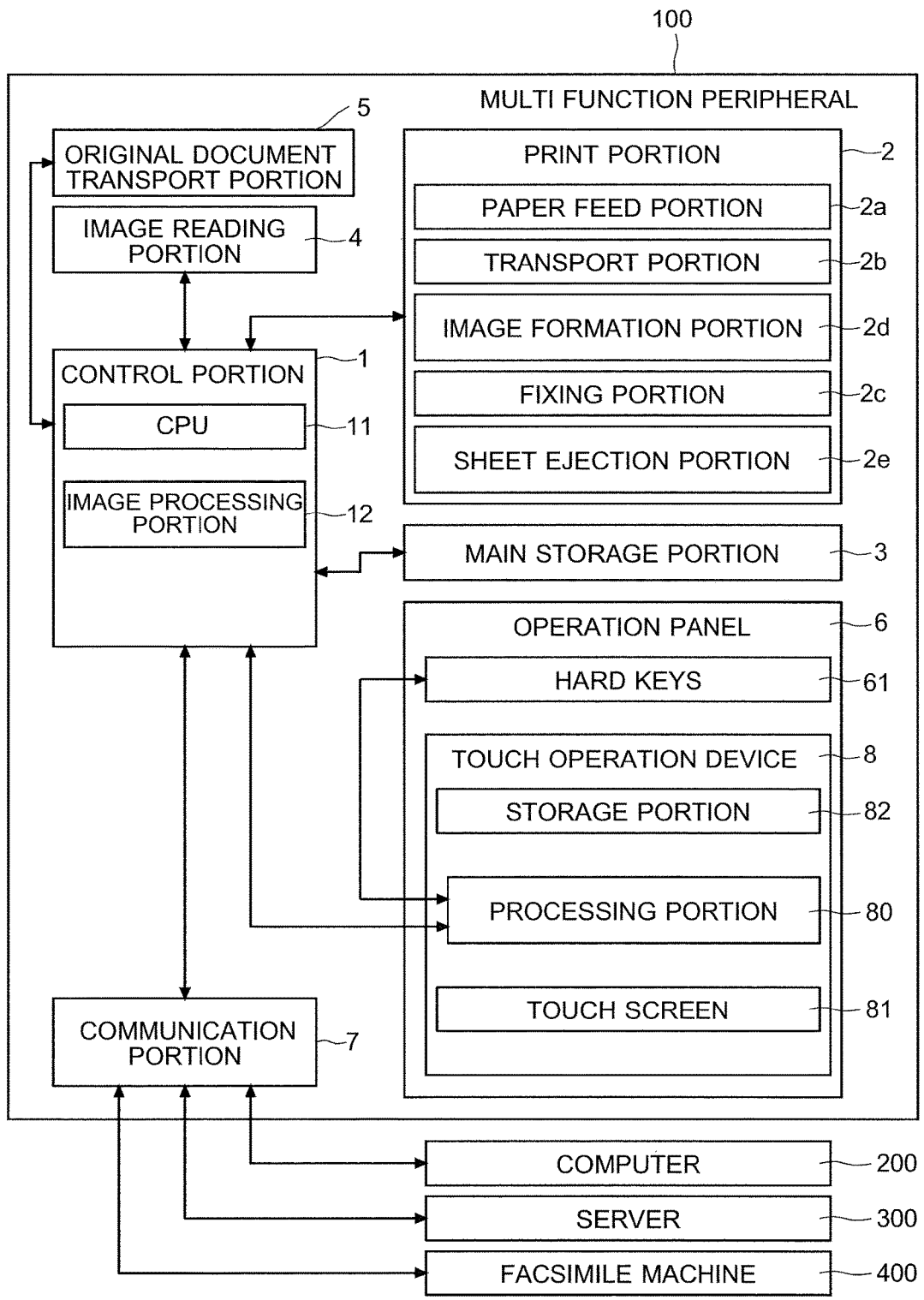
FIG. 1 is a diagram showing an example of a multifunction peripheral which includes a touch operation device according to an embodiment.
Figure 2:
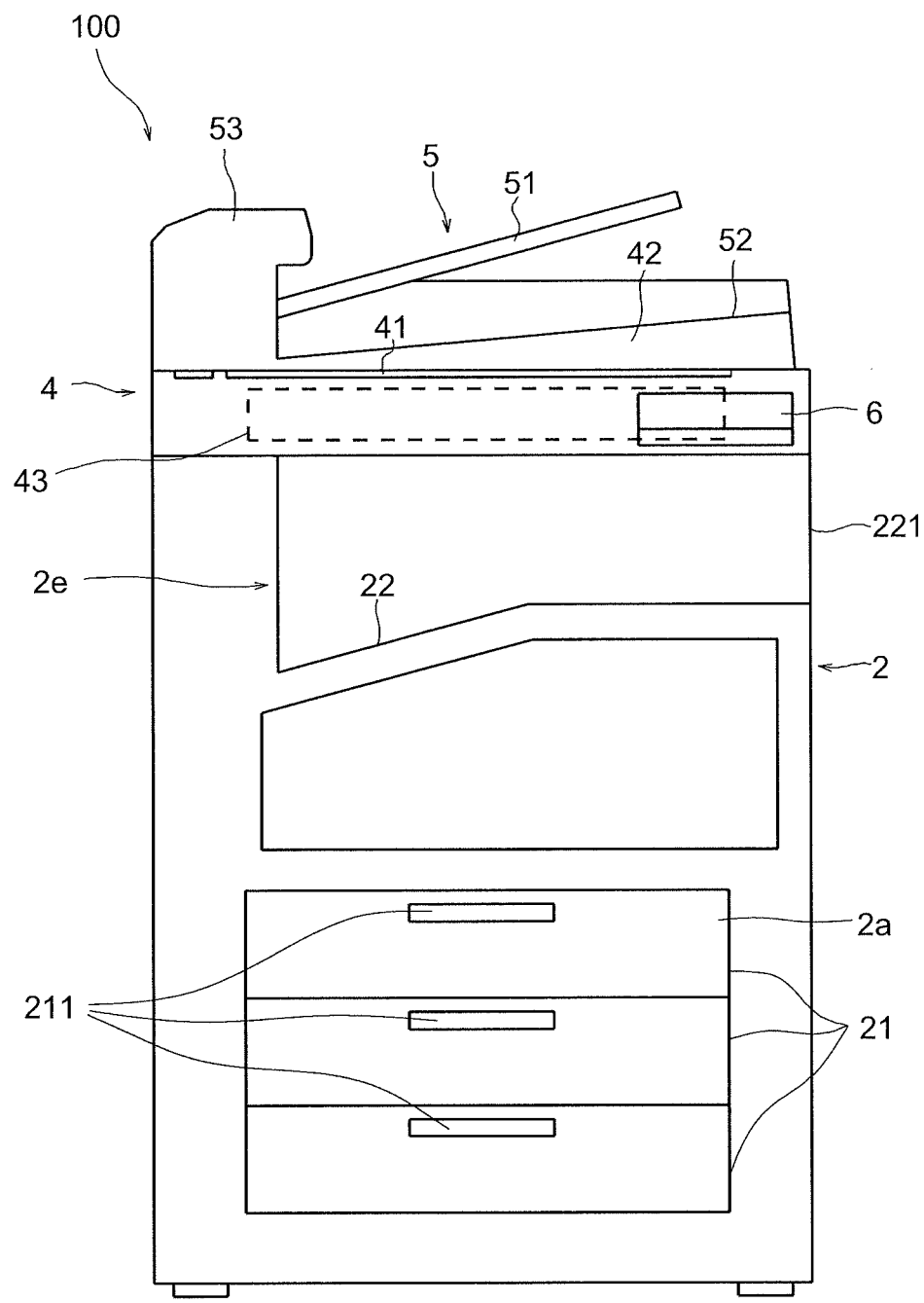
FIG. 2 is a diagram showing an example of the multifunction peripheral shown in FIG. 1.
Figure 3:
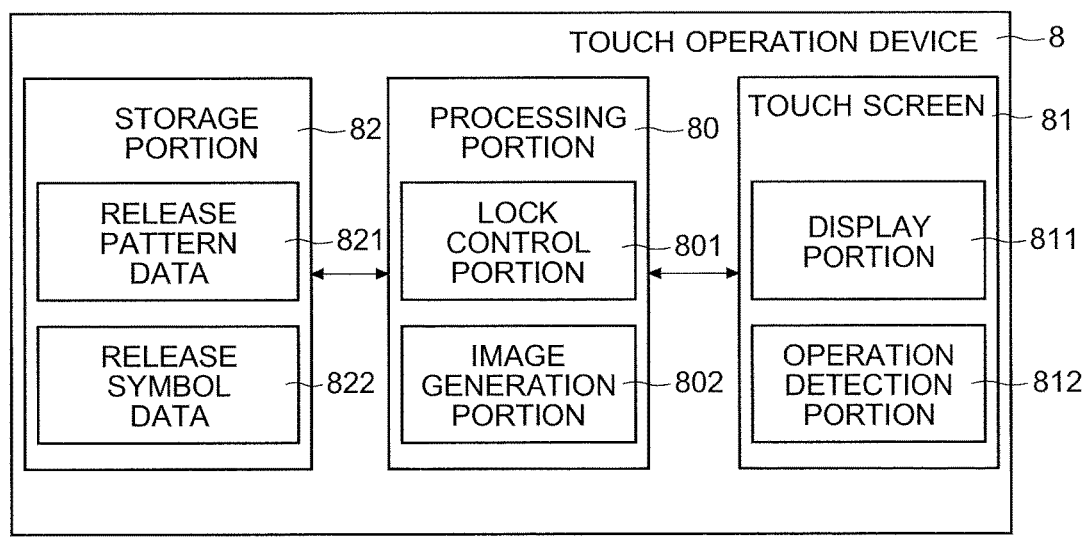
FIG. 3 is a diagram showing an example of the touch operation device according to the embodiment.
Figure 4:
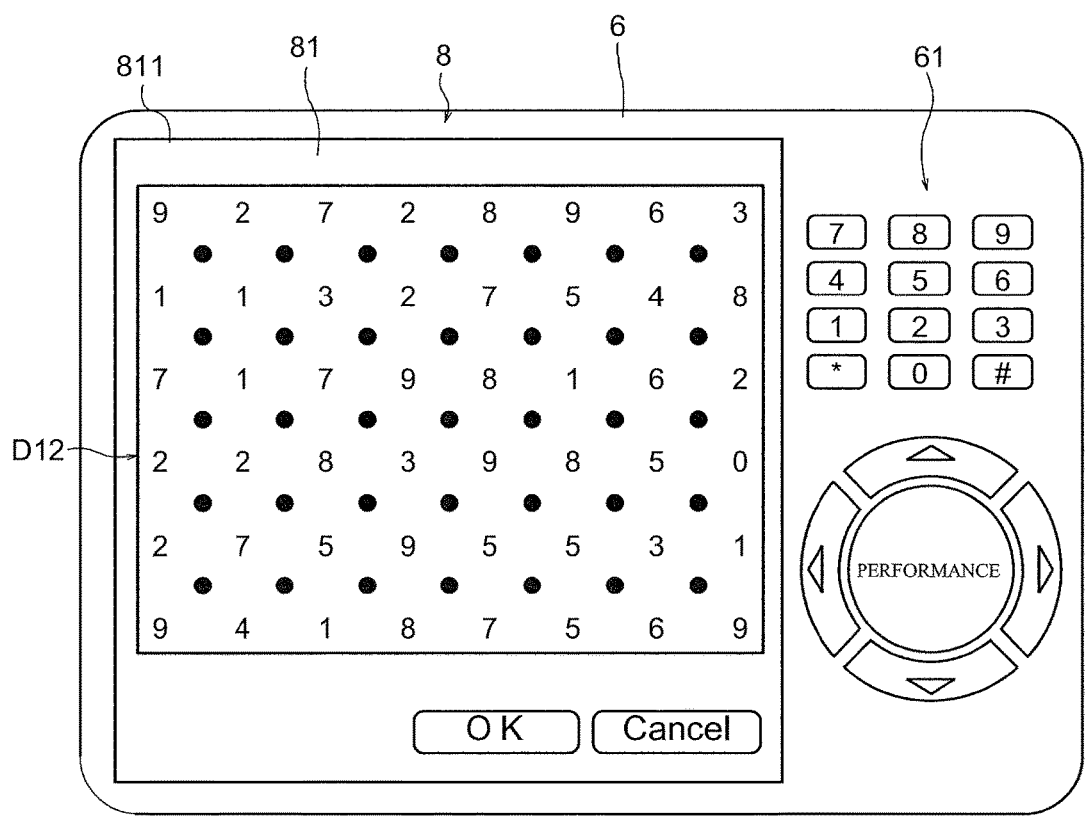
FIG. 4 is a diagram showing an example of an operation panel which includes the touch operation device according to the embodiment.

FIG. 1 is a functional block diagram showing a main configuration of a multifunction peripheral according to the embodiment. FIG. 2 is a diagram showing an example of the multifunction peripheral shown in FIG. 1. FIG. 3 is a diagram showing an example of the touch operation device according to the embodiment. FIG. 4 is a diagram showing an example of an operation panel which includes the touch operation device according to the embodiment.

(MultiFunction Peripheral 100)

The multifunction peripheral 100 includes the touch operation device. The multifunction peripheral 100 (image forming apparatus) includes a plurality of functions such as a copying function, a printer function, a scanner function and a facsimile function. The multifunction peripheral 100 is an example of a device which includes the touch operation device according to the embodiment.

As shown in FIGS. 1 and 2, a control portion 1, a print portion 2 and a main storage portion 3 are provided in the multifunction peripheral 100. The multifunction peripheral 100 also includes an image reading portion 4, an original document transport portion 5 and an operation panel 6. As shown in FIG. 2, the image reading portion 4 is provided above the print portion 2. The original document transport portion 5 is provided above the image reading portion 4. The multifunction peripheral 100 also includes a communication portion 7. The operation panel 6 includes the touch operation device 8 according to the embodiment.

(Control Portion 1)

The control portion 1 performs overall control on the multifunction peripheral 100. The control portion 1 includes a CPU 11. The multifunction peripheral 100 also includes the main storage portion 3. The main storage portion 3 includes nonvolatile memories such as a ROM, an HDD and a flash ROM and volatile memories such as a RAM. The main storage portion 3 includes programs and data for the control. The control portion 1 utilizes the programs and data in the main storage portion 3 so as to control the individual portions. The control portion 1 controls scanning, printing, transmission and the storage of image data when copying, facsimile transmission and the like are performed.

In the control portion 1, an image processing portion 12 is provided. The image processing portion 12 performs image processing on image data output from the image reading portion 4. The image processing portion 12 also performs image processing on image data transmitted through the communication portion 7 from a computer 200, a server 300, a facsimile machine 400 or the like. The image processing portion 12 reads the details of images included in the image data.

(Print Portion 2)

The print portion 2 includes a paper feed portion 2a, a transport portion 2b, an image formation portion 2c, a fixing portion 2d and a sheet ejection portion 2e. The paper feed portion 2a supplies a sheet. The transport portion 2b transports the sheet and ejects the printed sheet to the outside of the machine. The image formation portion 2c forms a toner image based on the image data, and transfers the toner image to the transported sheet. The fixing portion 2d fixes the transferred toner image to the sheet. The control portion 1 controls the operation of the print portion 2.

As shown in FIG. 2, the paper feed portion 2a includes a plurality of paper feed cassettes 21. In the paper feed cassettes 21, the sheets are stored. The control portion 1 selects the appropriate size and direction of the sheet based on an instruction from a user. Then, the paper feed cassette 21 in which the appropriate sheets are stored is selected. The paper feed portion 2a feeds out the sheet from the selected paper feed cassette 21 according to an instruction from the control portion 1. The paper feed cassettes 21 can be pulled out forward (in FIG. 2, toward the front of the plane of the sheet) from the side of the front surface of the multifunction peripheral 100. Grip portions 211 are exposed to the front surface.

An ejection tray 22 is arranged in a gap provided between the print portion 2 and the image reading portion 4. The sheet in which an image is fixed in the fixing portion 2d is ejected to the ejection tray 22 by the sheet ejection portion 2e. The ejection tray 22 has an opening 221 in the right side of the multifunction peripheral 100.

(Image Reading Portion 4)

Based on the control by the control portion 1, the image reading portion 4 reads the image of an original document so as to generate image data. As shown in FIG. 2, the image reading portion 4 includes contact glass 41 (original document stage) on which the original document is placed. The image reading portion 4 includes an original document holding cover 42 and a reading mechanism 43. The original document holding cover 42 is freely opened and closed, and holds the original document placed on the contact glass 41. The reading mechanism 43 reads the original document placed on the contact glass 41 or the original document transported to the contact glass 41.

(Original Document Transport Portion 5)

Based on the control by the control portion 1, the original document transport portion 5 transports the original document to the contact glass 41 in the image reading portion 4. The original document transport portion 5 includes an original document placement stage 51 on which the original document is placed, an original document ejection portion 52 to which the original document whose image has been read is ejected and an original document transport mechanism 53 (see FIG. 2). The original document transport mechanism 53 include a paper feed roller, a transport roller and the like which are not illustrated. By the drive of the paper feed roller and the transport roller, the original document transport mechanism 53 feeds out the original documents placed on the original document placement stage 51 one by one. The original document transport mechanism 53 transports the original document to the contact glass 41. The original document transported to the contact glass 41 is read by the reading mechanism 43. Thereafter, the original document is ejected to the original document ejection portion 52.

The image reading portion 4 optically reads the original document transported by the original document transport portion 5 or the original document placed on the contact glass 41. Then, the image reading portion 4 generates the image data. The image data generated by the image reading portion 4 is stored in the main storage portion 3, a computer connected to a network or the like.

(Communication Portion 7)

The communication portion 7 is connected to the computer 200 (PC), the server 300 and the facsimile machine 400 through a wired and (or) wireless network, a public line or the like such that the communication portion 7 can communicate therewith.

(Operation Panel 6)

As shown in FIG. 1, the operation panel 6 includes hard keys 61 and the touch operation device 8. The hard keys 61 have physical shapes (physical keys). As shown in FIG. 4, the hard keys 61 are arranged on a side of the operation panel 6 (a touch screen 81 which will be described later). The hard keys 61 include a numerical keypad for input of digits, a selection key for selection of upward, downward, leftward and rightward directions and a performance key. Furthermore, another hard key may be provided. The hard keys 61 are connected to a processing portion 80 which will be described later. Input information (signals) are transmitted through the processing portion 80 to the control portion 1.

(Touch Operation Device 8)

The details of the touch operation device 8 will be described. As shown in FIG. 3, the touch operation device 8 includes the processing portion 80, the touch screen 81 and a storage portion 82.

The processing portion 80 is a control portion which controls the touch operation device 8. The processing portion 80 includes a lock control portion 801 and an image generation portion 802. As with the control portion 1, the processing portion 80 includes a computation processing circuit (for example, a CPU). The processing portion 80 has a smaller amount of processing than the control portion 1. Hence, as the computation processing circuit included in the processing portion 80, a computation processing circuit can be used whose capability is lower than that of the CPU included in the control portion 1. The control portion 1 and the processing portion 80 may be integrated with each other. For example, the processing portion 80 may form part of the control portion 1. The processing portion 80 has the functions of the lock control portion 801 and the image generation portion 802, and may be programs which will be executed in the control portion 1 (for example, the CPU 11).

The processing portion 80 and the control portion 1 are separate members, and thus when the multifunction peripheral 100 is in a power saving mode, it is possible to bring the control portion 1 into a dormant state. The dormant state refers to a state where the supply of power is stopped. The processing portion 80 is brought into a standby state where the minimum amount of power is supplied. Only the processing portion 80 whose power consumption is lower than the control portion 1 is brought into the standby state. In this way, it is possible to reduce power consumption as compared with a case where the entire control portion 1 is brought into the standby state.

The lock control portion 801 controls the lock state and the lock release of the whole or part of the functions of the touch operation device 8. The lock control portion 801 may be provided as a processing circuit in the processing portion 80. The lock control portion 801 may be programs which are operated in a computation circuit within the processing portion 80. A description will be given with the assumption that the lock control portion 801 is part of the functions of the processing portion 80.

In the lock state, for example, the touch operation device 8 does not receive an operation input in the touch screen 81 except a lock release operation. Even when the lock state is enabled by the lock control portion 801, the touch operation device 8 may receive part of an operation other than the lock release operation. The function and the operation of the lock control portion 801 will be described in detail later.

The image generation portion 802 generates an image (image data). The image generation portion 802 generates the image (image data) for display. A display portion 811 (which will be described in detail later) displays the image generated by the image generation portion 802. The image generation portion 802 generates the image data of the lock release screen (lock release image). In the lock state, the processing portion 80 (the image generation portion 802) makes the display portion 811 display the lock release screen (screen based on the generated image data). The lock release screen is displayed when the lock state is released. The image generation portion 802 generates the lock release screen according to an instruction from the lock control portion 801. In FIG. 3, the lock control portion 801 and the image generation portion 802 are shown as separate members. However, the lock control portion 801 may include the image generation portion 802.

The touch screen 81 is connected to the processing portion 80. Between the touch screen 81 and the processing portion 80, information (signals) is exchanged. The touch screen 81 displays an image (screen). The touch screen 81 receives contact with the displayed image (the selection/release of the displayed image, an input). The touch screen 81 is a so-called display with a touch panel. The touch screen 81 includes the display portion 811 (display) and an operation detection portion 812 (touch panel). The display portion 811 displays an image. The display portion 811 is, for example, a liquid crystal panel or an organic EL panel (the display portion 811 may be a display panel other than these panels). Panels which are in a planar shape and which can display an image can be widely adopted as the display portion 811.

The operation detection portion 812 is arranged on the front surface of the display portion 811. The operation detection portion 812 detects contact with an instruction member (for example, a finger of the user). The operation detection portion 812 detects a contact position (coordinates on the operation detection portion 812). The operation detection portion 812 has translucency. The user can visually recognize, from the side opposite to the display portion 811, the image displayed on the display portion 811 which is adjacently arranged. As the operation detection portion 812, a component which detects the pressure of the finger of the user or a component which detects the charge of the finger of the user can be used. The operation detection portion 812 is not limited to these components. It is possible to adopt a configuration in which the position of the finger of the user can be detected. The operation detection portion 812 detects the position of the finger of the user. The user can specify and select, with the finger, the image displayed on the display portion 811. The touch screen 81 can be used as an input device.

Information necessary for the lock release is recorded in the storage portion 82. The storage portion 82 records release pattern data 821 and release symbol data 822. The release pattern data 821 is data for the lock release. The release pattern data 821 indicates a trace (pattern) of the finger of the user necessary for the release. When the lock state is released, the user touches displayed guides. The user connects the guides together so as to draw the trace. The release symbol data 822 indicates symbols necessary for the lock release. The symbols necessary for the lock release include, for example, a digit. The storage portion 82 is connected to the lock control portion 801. The lock control portion 801 accesses the storage portion 82. The lock control portion 801 acquires the release pattern data 821 and the release symbol data 822. The release pattern data 821 and the release symbol data 822 are previously determined by the user.

(Registration of Release Pattern and Release Symbol)

Figure 5:
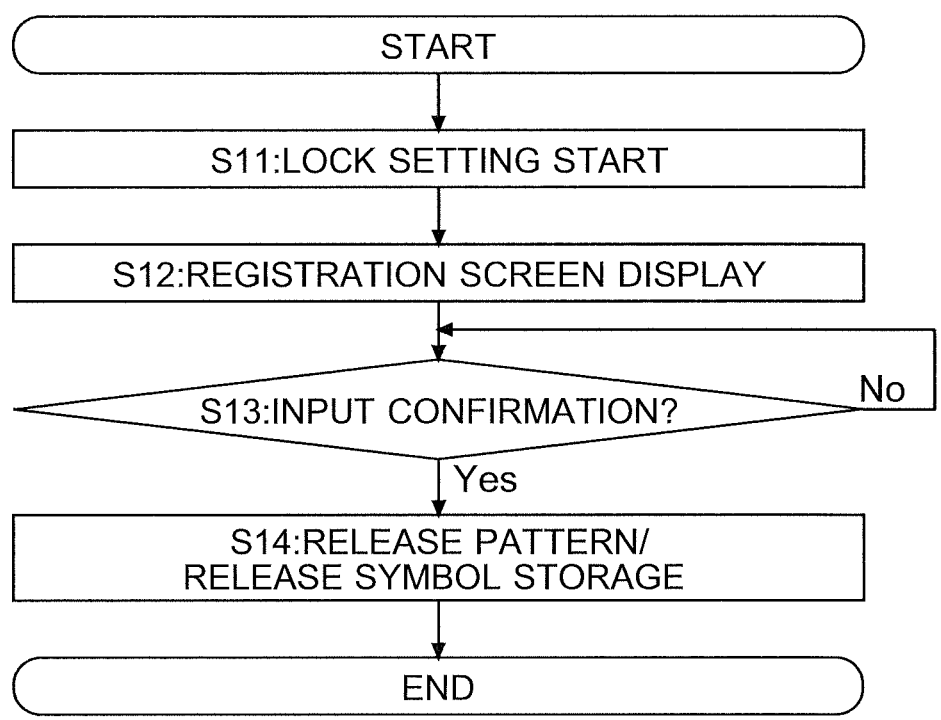
FIG. 5 is a diagram showing an example of a procedure for registering symbols and a pattern for lock release with the touch operation device according to the embodiment.
Figure 6:
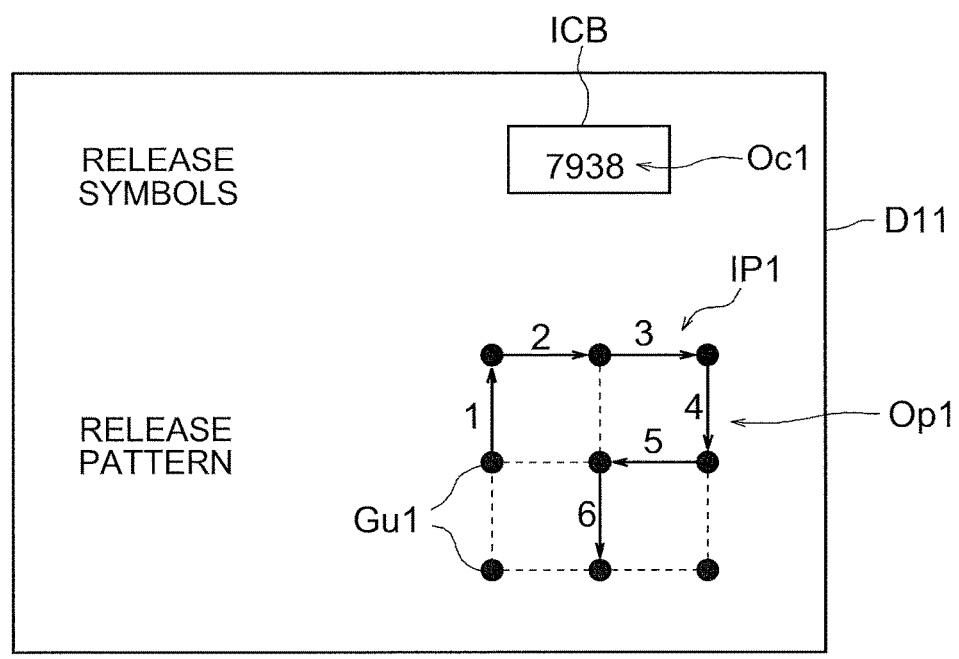
FIG. 6 is a diagram showing an example of a registration screen in the embodiment.

The operation of the touch operation device 8 will then be described. FIG. 5 is a diagram showing an example of a procedure for registering symbols and a pattern for the lock release in the embodiment. FIG. 6 is a diagram showing an example of a registration screen in the embodiment.

The symbols include digits, characters and designs. The designs include known drawing patterns such as a heart and a diamond. The designs are not limited to the known drawing patterns. Any symbol may be used as long as the symbol can be distinguished by the user. For example, a company emblem and a corporate mark may be dealt with as the symbols. Furthermore, a configuration may be adopted in which a drawing pattern can be registered by the user. An example where a number is used as the symbols will be described below.

In the touch operation device 8, release symbols Oc1 and a release pattern Op1 can be registered. The release symbols Oc1 are a password which is used by the user for releasing the lock state. The start of FIG. 5 is a time when the user performs an operation for starting a lock state. The lock state is a setting which is made to register the release symbols and the release pattern. When the user performs the operation for starting the lock state (step S11), the processing portion 80 (the lock control portion 801) makes the touch screen 81 (the display portion 811) display a registration screen D11 (step S12, see FIG. 6). The registration screen D11 is a screen for registering the lock release data (the release symbols Oc1 and the release pattern Op1).

FIG. 6 shows a state after the input of the release symbols Oc1 and the release pattern Op1. The registration screen D11 includes an input portion ICB and a registration guide IP1. The input portion ICB is a portion into which the release symbols Oc1 are input. The input portion ICB is a box into which symbols are input. The registration guide IP1 is a portion into which the release pattern Op1 is input. For example, when the input portion ICB is touched, the processing portion 80 makes the display portion 811 display a software keyboard for input of symbols. The input of symbols is performed with the touch screen 81. The input of symbols may be performed with the hard keys 61. In the description here, the release symbols Oc1 are assumed to be a four-digit number. The number of symbols in the release symbols Oc1 is equal to the number of symbols arranged around one guide Gu1. FIG. 6 show an example where "7938" are registered as the release symbols Oc1.

The registration guide IP1 includes a total of nine guides Gu1. The guides Gu1 are arranged at regular intervals such that three guides are individually aligned vertically and laterally. The user traces the touch screen 81 with the finger so as to connect the guides Gu1 together. The user inputs the release pattern Op1 (the trace of the finger for the release). FIG. 6 shows an example where a trace in which the guides are connected from a guide on the left side in a center stage to an "upper" guide, to a "right" guide, to a "right" guide, to a "lower" guide, to a "left" guide and then to a "lower" guide is registered as the release pattern Op1. The trace (the release pattern Op1) is completed at the guide in the center of the lower stage. The registration screen D11 is an example. There is no limitation to the registration screen D11. Configurations in which the release symbols and the release pattern can be registered can be widely adopted.

The lock control portion 801 continues to confirm whether or not the user inputs the release symbols Oc1 and the release pattern Op1 (step S13, no in step S13→step S13). The lock control portion 801 is on standby until the release symbols Oc1 and the release pattern Op1 are input. When the lock control portion 801 confirms the input, the lock control portion 801 makes the storage portion 82 store the release pattern Op1 and the release symbols Oc1 (step S14). The lock control portion 801 makes the storage portion 82 store the input release pattern Op1 as the release pattern data 821. The lock control portion 801 makes the storage portion 82 store the input release symbols Oc1 as the release symbol data 822. The release pattern Op1 and the release symbols Oc1 are associated with each other. Any one of the release pattern and the release symbols is specified, and thus it is possible to acquire the other information. In the touch operation device 8, the registration of the release symbols Oc1 and the release pattern Op1 is received, and they are stored in the storage portion 82.

(Lock Release)

Figure 7:
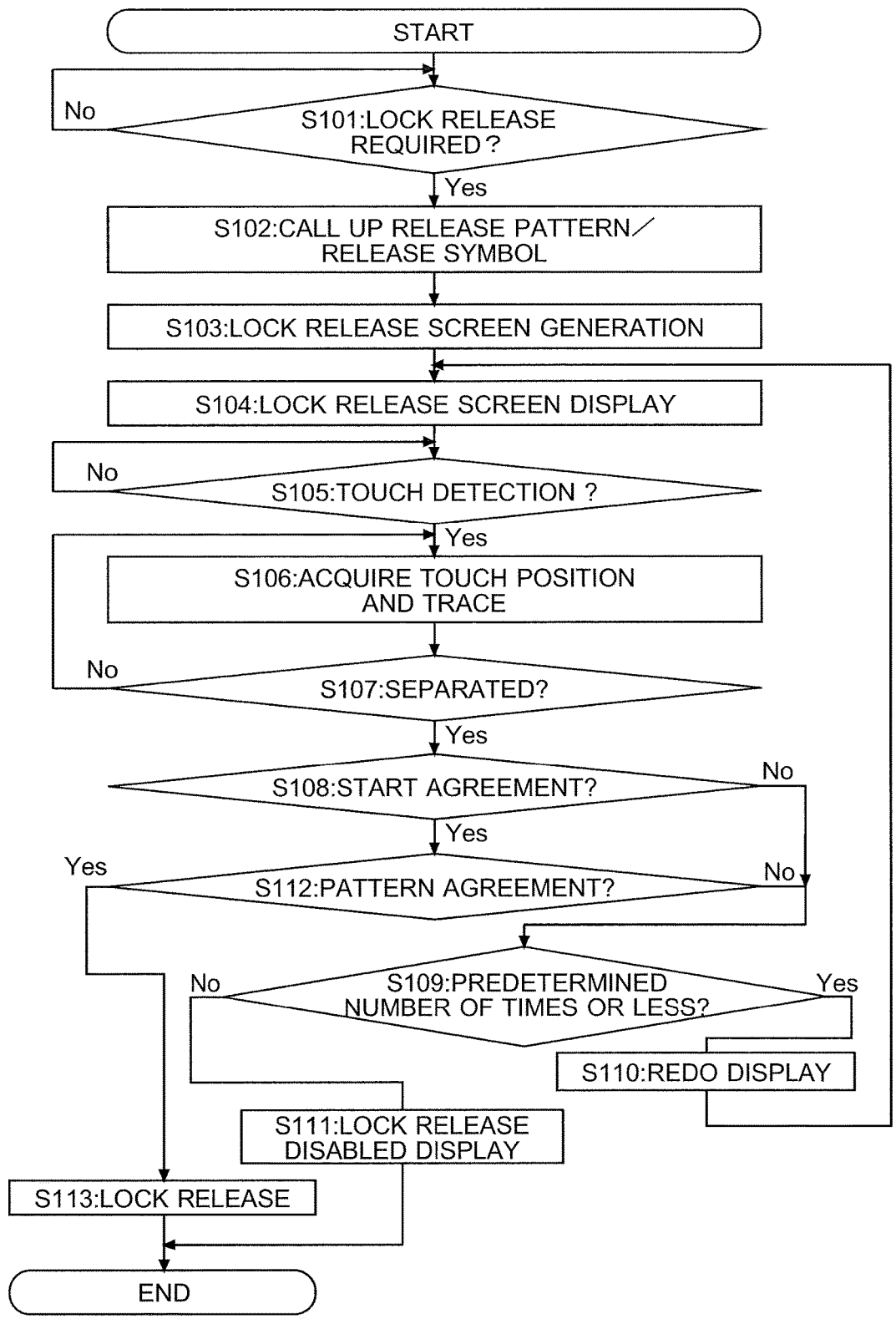
FIG. 7 is a diagram showing an example of a procedure for a lock release operation in the embodiment.

A procedure for releasing the lock state of the touch operation device 8 in the lock state will then be described with reference to drawings. FIG. 7 is a diagram showing an example of the procedure for the lock release operation in the embodiment.

The multifunction peripheral 100 includes a sleep mode. The sleep mode is a mode in which when the multifunction peripheral 100 is not used for a long period of time, the supply of power to the individual portions is stopped or minimized. In the multifunction peripheral 100, the minimum amount of power is supplied to only the operation panel 6. For example, the power is supplied to the operation panel 6 such that the touch operation on the touch screen 81 and the operation input on the hard keys 61 can be detected. When the touch operation device 8 is transferred to the sleep mode, the touch operation device 8 is brought into the lock state. Even when the sleep mode is completed, the lock state is continued.

As shown in FIG. 7, in the sleep mode, the lock control portion 801 confirms whether or not the lock release is required (step S101). For example, the lock control portion 801 confirms contact of the finger of the user with the touch screen 81, the operation input on the hard keys 61 and the like. Both the hard keys 61 and the operation detection portion 812 are connected to the lock control portion 801. Hence, the lock control portion 801 can confirm, based on signals from these devices, whether or not the operation is performed. Until the lock release is required (until yes in step S101), the lock control portion 801 is on standby. An example where the finger of the user is assumed to be the indication member which makes contact with the touch screen 81 will be described below. However, the indication member is not limited to the finger of the user. For example, a tool such as a touch pen may be assumed to be the indication member. In this case, the touch screen 81 detects contact with the tool.

When the lock release is required (yes in step S101), the lock control portion 801 calls up the release pattern Op1 and the release symbols Oc1 from the release pattern data 821 and the release symbol data 822 (step S102). The lock control portion 801 transmits the release symbols Oc1 to the image generation portion 802. Based on the release symbols Oc1, the image generation portion 802 generates a lock release screen D12 (step S103).

Figure 8:
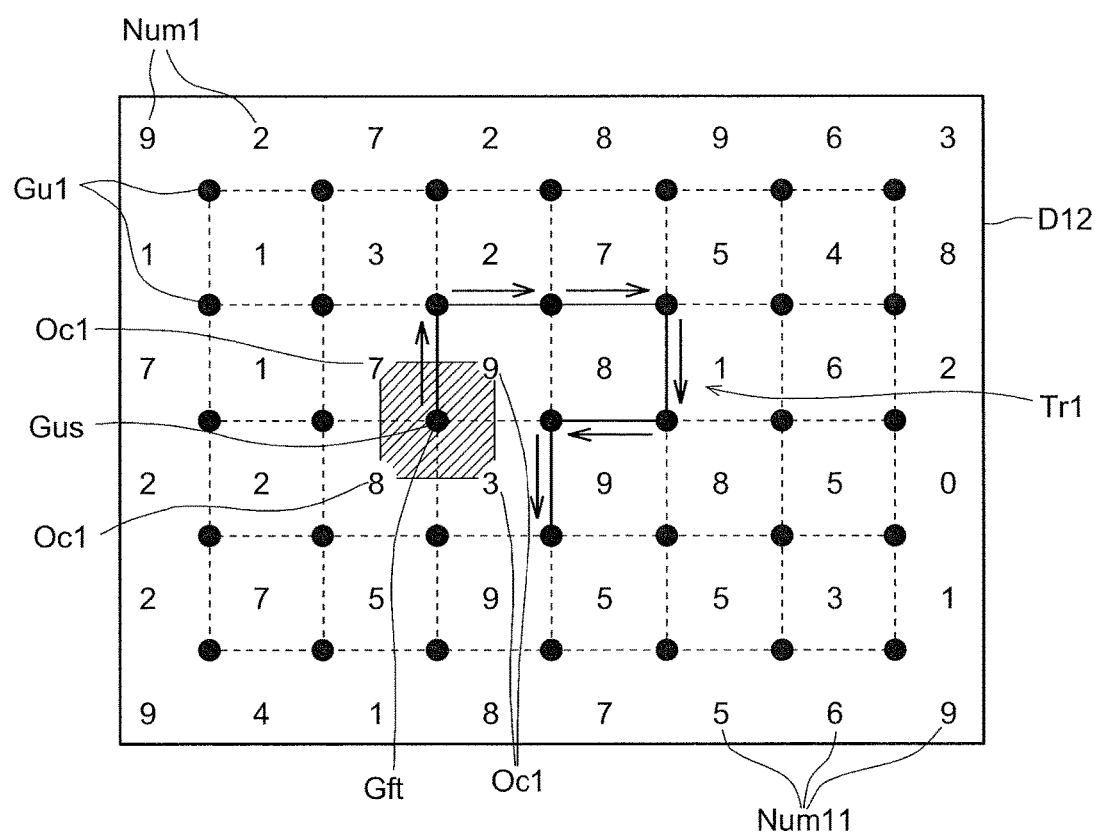
FIG. 8 is a diagram showing an example of a lock release screen in the embodiment.

The lock release screen D12 will be described. FIG. 8 shows an example of the lock release screen D12 in the embodiment. In FIG. 8, an input pattern Tr1 which is drawn by the finger of the user is shown. The lock release screen D12 includes a plurality of guides Gu1 and a plurality of symbols. The guides Gu1 and the symbols are arranged at regular intervals vertically and laterally. The symbols shown in FIG. 8 are digits Num1. The guides Gu1 shown in FIG. 8 are individually solid filled circles. The individual guides Gu1 are points which serve as guides when the user moves the finger on the touch screen 81. The image generation portion 802 generates the lock release screen D12 in which the guides Gu1 are disposed in an arrangement that is determined according to the number of symbols included in the release symbols Oc1.

The user makes the finger slide on the touch screen 81 so as to connect the guides Gu1 together. The trace of the finger of the user input on the touch screen 81 is the input pattern Tr1. An operation of inputting the input pattern Tr1 is included in the lock release operation. FIG. 8 shows the lock release screen D12 in which the guides Gu1 are arranged in a matrix of 5×7 (vertically×horizontally). FIG. 4 shows the touch screen 81 (the operation panel 6) on which the lock release screen D12 is displayed.

As shown in FIG. 8, the symbols Num1 are individually arranged on the "upper left" side, the "upper right" side, the "lower right" side and the "lower left" side of the guide Gu1. The symbols Num1 are also arranged at regular intervals vertically and laterally. The intervals between the individual symbols Num1 and the guides Gu1 adjacent thereto are equal to each other. The individual guides Gu1 in FIG. 8 are arranged in the positions of the vertexes of squares which are spread on the screen and which have the same size. The sides of the squares adjacent to each other are overlaid on each other. In FIG. 8, the imaginary squares are shown by broken lines. The broken lines may or may not be displayed. The symbols Num1 are also arranged in the positions of the vertexes of squares which are spread on the screen and which have the same size. The arrangement pitch of the symbols Num1 and the arrangement pitch of the guides Gu1 are the same as each other. The phases of the arrangements are displaced from each other by a half pitch. Hence, each of the guides Gu1 is surrounded by four symbols Num1.

The processing portion 80 (the image generation portion 802) sets one of the guides Gu1 to a start guide Gus. The image generation portion 802 may set the position of the start guide Gus to a different position each time the image generation portion 802 generates the image data of the lock release screen D12. In FIG. 8, the guide which is the third from the top and which is the third from the left is the start guide Gus. In FIG. 8, in order for the start guide Gus to be distinguished from the other guides Gu1 and in order for the position thereof to be clarified, the surrounding of the start guide Gus is hatched (in the actual screen, the surrounding is not hatched).

The processing portion 80 (the image generation portion 802) respectively arranges the symbols of "7", "9", "3" and "8" in the release symbols Oc1 on the "upper left" side, the "upper right" side, the "lower right" side and the "lower left" side of the start guide Gus. The processing portion 80 arranges the symbols Num1 around the guides Gu1 other than the start guide Gus such that the arrangement which agrees with the arrangement of the release symbols Oc1 is prevented from being generated.

The processing portion 80 (the image generation portion 802) generates the image data of the lock release screen D12 as follows. Specifically, the image generation portion 802 arranges the symbols Num1 in the positions of the vertexes of the squares which have the same shape and which are spread. The image generation portion 802 arranges the guides Gu1 in the centers of the squares. The image generation portion 802 surrounds the start guide Gus with the same symbols as the release symbols Oc1. The image generation portion 802 arranges the symbols Num1 such that the symbols Num1 (dummy symbols Num11) surrounding the other guides Gu1 are prevented from agreeing with the release symbols Oc1.

The processing portion 80 (the image generation portion 802) recognizes the number of symbols (the number of the dummy symbols Num11) arranged around the guides Gu1 other than the start guide Gus. Specifically, in the case of the lock release screen D12 of FIG. 8, eight symbols are arranged in one row. In the case of the lock release screen D12 of FIG. 8, the number of rows is six. In other words, the processing portion 80 (the image generation portion 802) includes 48 symbols (digits) within the lock release screen D12. Among the 48 symbols, four symbols are the release symbols Oc1. The processing portion 80 (the image generation portion 802) subtracts the number of symbols in the release symbols Oc1 from the total number of symbols Num1 included in the lock release screen D12 so as to recognize the number of symbols (the number of the dummy symbols Num11). The processing portion 80 (the image generation portion 802) determines the values (digits) of the dummy symbols Num11. The processing portion 80 (the image generation portion 802) determines the symbols Num1 with a predetermined algorithm. The algorithm in which the values (digits) determined are prevented from being biased is adopted. The algorithm in which the values are randomly selected with a predetermined method is used. The processing portion 80 (the image generation portion 802) arranges, in the arrangement position of the dummy symbol Num11, any one of the values of the dummy symbols Num11 which are determined. In this way, the arrangement positions of the individual symbols are determined.

In this way, the user can identify the start guide Gus from the release symbols Oc1 in the lock release screen D12. In FIG. 8, an example is described where the symbol in the first place, the symbol in the second place, the symbol in the third place and the symbol in the fourth place of the release symbols are respectively arranged on the "upper left" side, the "upper right" side, the "lower right" side and the "lower left" side of the start guide Gus. The arrangement method is not limited to this method. The four-digit release symbols may be randomly arranged around the start guide Gus. In the lock release screen D12, when the release symbols Oc1 are known, the start guide Gus can be distinguished from a plurality of guides Gu1.

With reference back to FIG. 7, the lock release operation will be described. The image generation portion 802 generates and displays the lock release screen D12. The image generation portion 802 makes the display portion 811 display the lock release screen D12 generated in step S103 (step S104). The image generation portion 802 feeds, to the lock control portion 801, the information of the position of the start guide Gus set in the lock release screen D12. The image generation portion 802 sets, within the lock release screen D12, the start guide Gus in a position in which the same input pattern Tr1 as the release pattern Op1 can be drawn.

After the requirement of the lock release, the lock control portion 801 confirms whether or not the finger of the user touches the touch screen 81 (step S105). When the touch of the finger of the user on the touch screen 81 is detected, the lock control portion 801 determines that the input of the input pattern Tr1 by the user is started. When the lock release is required by the touch of the finger of the user on the touch screen 81, the finger of the user may continue to touch the touch screen 81. In such a case, the lock control portion 801 may make the display portion 811 display a message for prompting the user to temporarily separate the finger from the touch screen 81. The processing portion 80 may set a touch position when a given time elapses after the contact to the start position of the input of the input pattern to the touch screen 81. A description will be given below with the assumption that after the display of the lock release screen D12, the finger of the user which is temporarily separated makes contact with the touch screen 81.

Until the touch of the finger of the user on the touch screen 81 is confirmed (until yes in step S105), the lock control portion 801 is on standby. Then, when the touch of the finger of the user on the touch screen 81 is detected (yes in step S105), the lock control portion 801 acquires the information of the position (the guide Gu1: see FIG. 8) in which the finger of the user makes contact therewith and the trace of the finger (step S106). The lock control portion 801 may detect the contact position and the trace of the finger at regular time intervals. The lock control portion 801 may detect, each time the finger of the user makes contact with the guide Gu1, the guide Gu1 with which to make contact, and may connect it to the guide Gu1 with which to make contact immediately therebefore so as to form a trace. The lock control portion 801 makes the storage portion 82 store the guide Gu1 first touched by the finger of the user as the first guide Gft of the input pattern. The lock control portion 801 also makes the storage portion 82 store the guides Gu1 traced by the finger of the user and the trace thereof. The trace of the finger of the user is the input pattern that is input by the user to the touch screen 81 on which the lock release screen D12 is displayed. The lock control portion 801 acquires the guides touched by the finger of the user and the trace thereof. In this way, the lock control portion 801 acquires the input pattern input by the user.

Whether or not the finger of the user is separated from the touch screen 81 is confirmed (step S107). When the contact of the finger of the user with the touch screen 81 is detected (no in step S107), the lock control portion 801 determines that the input of the input pattern Tr1 is continued. The flow returns to step S106.

When it is detected that the finger of the user is separated from the touch screen 81 (yes in step S107), the lock control portion 801 determines that the input of the input pattern Tr1 by the user is completed. Then, the lock control portion 801 acquires the trace (the input pattern Tr1) stored in the storage portion 82. The lock control portion 801 confirms whether or not the positions of the first guide Gft of the input pattern and the start guide Gus notified by the image generation portion 802 agree with each other (step S108). When the positions of the first guide Gft of the input pattern and the start guide Gus do not agree with each other (no in step S108), the lock control portion 801 determines that the lock release is erroneously operated. Then, the lock control portion 801 confirms whether or not the number of times the lock release is erroneously operated in succession is equal to or less than a predetermined number of times (step S109). The predetermined number of times is previously determined. For example, the predetermined number of times is five.

Figure 9:
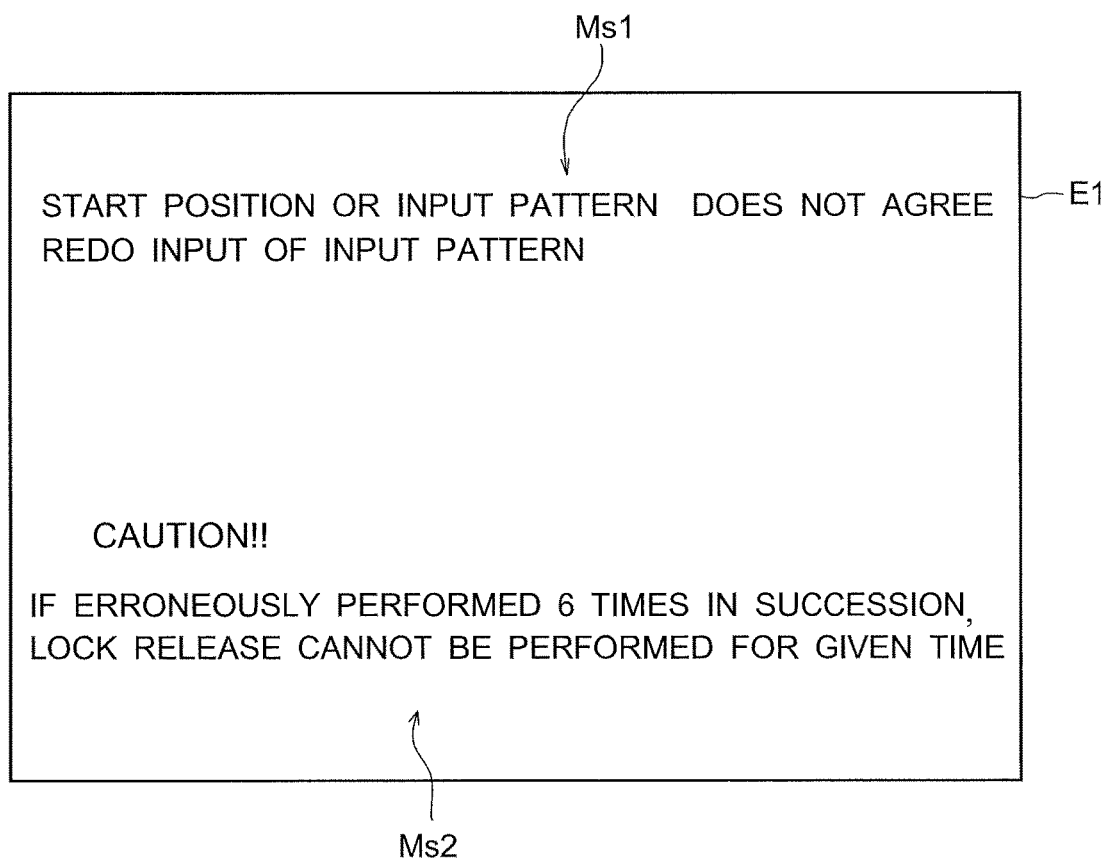
FIG. 9 is a diagram showing an example of a redo display screen in the embodiment.

When the number of times the lock release is erroneously operated in succession does not reach the predetermined number of times (yes in step S109), the lock control portion 801 makes the touch screen 81 display a redo display screen E1 (see FIG. 9) (step S110). The image data of the redo display screen E1 is previously prepared. FIG. 9 is a diagram showing an example of the redo display screen E1 in the embodiment. As shown in FIG. 9, the redo display screen E1 includes a message Ms1 for providing a notification that the lock release is erroneously operated. The redo display screen E1 also includes a message Ms2 for providing a warning that when the number of times the lock release is erroneously operated in succession reaches six, the operation cannot be performed. Thereafter, the lock control portion 801 displays the lock release screen D12 (the flow returns to step S104). The detection of the input pattern is restarted.

Figure 10:
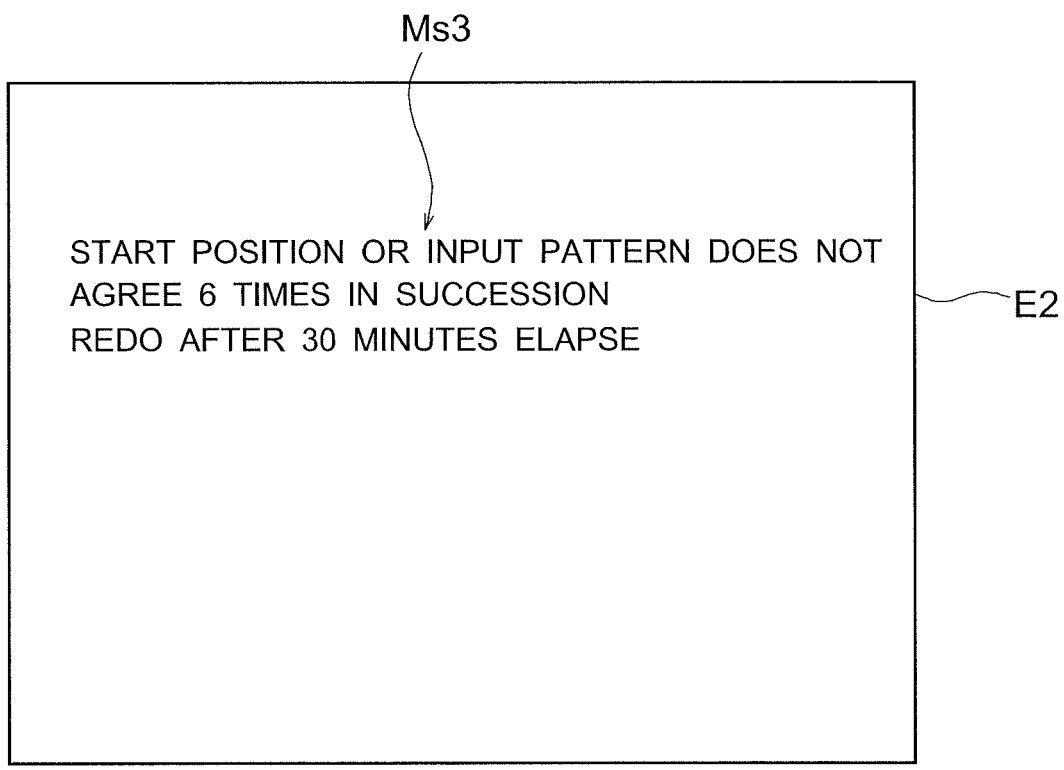
FIG. 10 is a diagram showing an example of a lock release disabled display screen in the embodiment.

When the number of times the lock release is erroneously operated in succession reaches the predetermined number of times (no in step S109), the lock control portion 801 makes the touch screen 81 display a lock release disabled display screen E2 (see FIG. 10) (step S111). The lock release disabled display screen E2 is previously prepared. FIG. 10 is a diagram showing an example of the lock release disabled display screen in the embodiment. As shown in FIG. 10, the lock release disabled display screen E2 includes a message Ms3 for providing a notification that since the lock release is erroneously operated six times in succession, the lock release cannot be performed for a given period of time. The given period of time is previously determined. Thereafter, the lock control portion 801 completes the processing for the lock release (end).

When the first guide Gft of the input pattern and the start guide Gus agree with each other (yes in step S108), the lock control portion 801 confirms whether or not the acquired input pattern Tr1 agrees with the previously stored release pattern Op1 (step S112). The input pattern Tr1 is determined based on the trace of the relative movement of the guide in contact and the guide with which to make contact immediately therebefore. Then, the lock control portion 801 uses the trace of the relative movement as the input pattern Tr1 so as to compare it with the release pattern Op1.

When the input pattern Tr1 and the release pattern Op1 do not agree with each other (no in step S112), the flow proceeds to step S109. The subsequent operation is determined based on the number of times the lock release is erroneously operated in succession. The operation of step S109 is as described above, and thus the details thereof will be omitted. When the input pattern Tr1 and the release pattern Op1 agrees with each other (yes in step S112), the lock control portion 801 releases the lock state (step S113).

As described above, the processing portion 80 (the image generation portion 802) makes the touch screen 81 display a plurality of guides Gu1 and a plurality of symbols Num1. The processing portion 80 displays the lock release screen D12 in which one guide is set to the start guide Gus. Only the start guide Gus is surrounded by the release symbols Oc1. Hence, only the user who knows the release symbols Oc1 can distinguish the start guide Gus. The image generation portion 802 changes the position of the start guide Gus every time. Then, when the input pattern Tr1 in which the start guide Gus is input as the first guide Gft of the input pattern agrees with the release pattern Op1, the lock state of the touch operation device 8 is released.

As described above, based on whether or not the first guide Gft of the input pattern agrees with the start guide Gus, the lock control portion 801 determines whether or not the user knows the release symbols. Based on whether or not the input pattern Tr1 agrees with the release pattern Op1, the lock control portion 801 determines whether or not the user knows the release pattern. Only the user who knows both the release symbols and the release pattern drawn by connecting the guides together can release the lock state. In this way, it is possible to enhance safety as compared with a conventional lock release method by which the lock state can be released with only the release pattern.

The example is described where the allowable number of times the lock release is erroneously operated in succession is set to five. The allowable number of times may be previously determined. The allowable number of times is not limited to five. The user may determine the allowable number of times. The example is described where when the number of times the lock release is erroneously operated in succession reaches the predetermined number of times, the lock release operation is disabled for 30 minutes. However, the time for which the lock release operation is disabled is not limited to 30 minutes. In a device in which there is no problem even when safety is slightly lowered, the release operation disabled time may be less than 30 minutes. In a device in which high safety is required, the release operation disabled time may be more than 30 minutes.

The description has been given using the touch operation device 8 (the operation panel 6) of the present disclosure as the example. However, the touch operation device 8 is not limited to the operation panel 6. The touch operation device 8 can be utilized as a touch operation device for an electronic device which includes a touch screen as an input device. Examples of the electronic device described above include a smart phone and a table PC. The touch operation device 8 as it is may be assembled to the electronic device. The method of releasing the lock state of the touch operation device 8 in the present disclosure (the operations of FIGS. 5 and 7) may be supplied to the electronic device as programs.

(First Variation)

Figure 11:
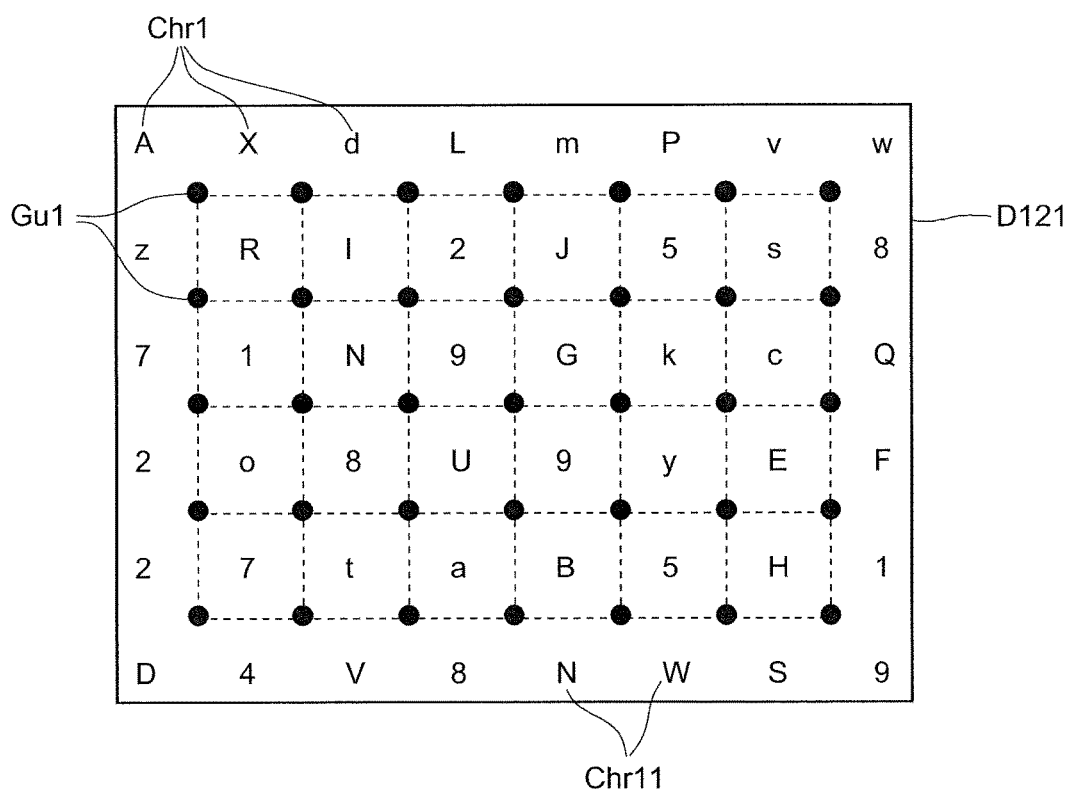
FIG. 11 is a diagram showing an example of a lock release screen in a first variation.

Variations of the touch operation device 8 according to the present disclosure will be described with reference to drawings. FIG. 11 is a diagram showing an example of a lock release screen D121 in a first variation.

FIG. 11 shows the example of the lock release screen D121 which includes characters as the symbols. In the embodiment discussed above, the example where digits are included as the symbols in the lock release screen D12 is described. As shown in FIG. 11, not only digits but also symbols Chr1 of the alphabet may be included.

The processing portion 80 (the image generation portion 802) recognizes the number of symbols Chr1 arranged around the guides Gu1 other than the start guide Gus. Specifically, in the case of the lock release screen D121 of FIG. 11, the processing portion 80 (the image generation portion 802) includes 48 symbols (digits or letters of the alphabet). Among the 48 symbols, four symbols are the release symbols Oc1 The processing portion 80 (the image generation portion 802) subtracts the number of symbols in the release symbols Oc1 from the total number of symbols Chr1 included in the lock release screen D121 so as to recognize the number of symbols (the number of the dummy symbols Chr11). The processing portion 80 (the image generation portion 802) determines the values of the dummy symbols Chr11. The value is a one-digit number or a letter of the alphabet. The processing portion 80 (the image generation portion 802) determines the symbols Chr1 with a predetermined algorithm. The algorithm in which the values (digits) determined are prevented from being biased is adopted. The processing portion 80 (the image generation portion 802) arranges, in the arrangement position of the dummy symbol Chr11, any one of the values of the dummy symbols Chr11 which are determined. In this way, the arrangement positions of the individual symbols are determined. The processing portion 80 (the image generation portion 802) generates the image data of the lock release screen D121 which includes the release symbols Oc1 and the dummy symbols Chr11.

The letters of the alphabet are included in the symbols Chr1, and thus the number of combinations of the release symbols Oc1 consisting of four characters is increased. Hence, the safety can be more enhanced. The symbols Chr1 are not limited to the letters of the alphabet and digits. For example, the symbols Chr1 may include Japanese language (hiragana and katakana characters). Unique characters of each country may be utilized. Symbols other than characters may be used.

(Second Variation)

Figure 12:
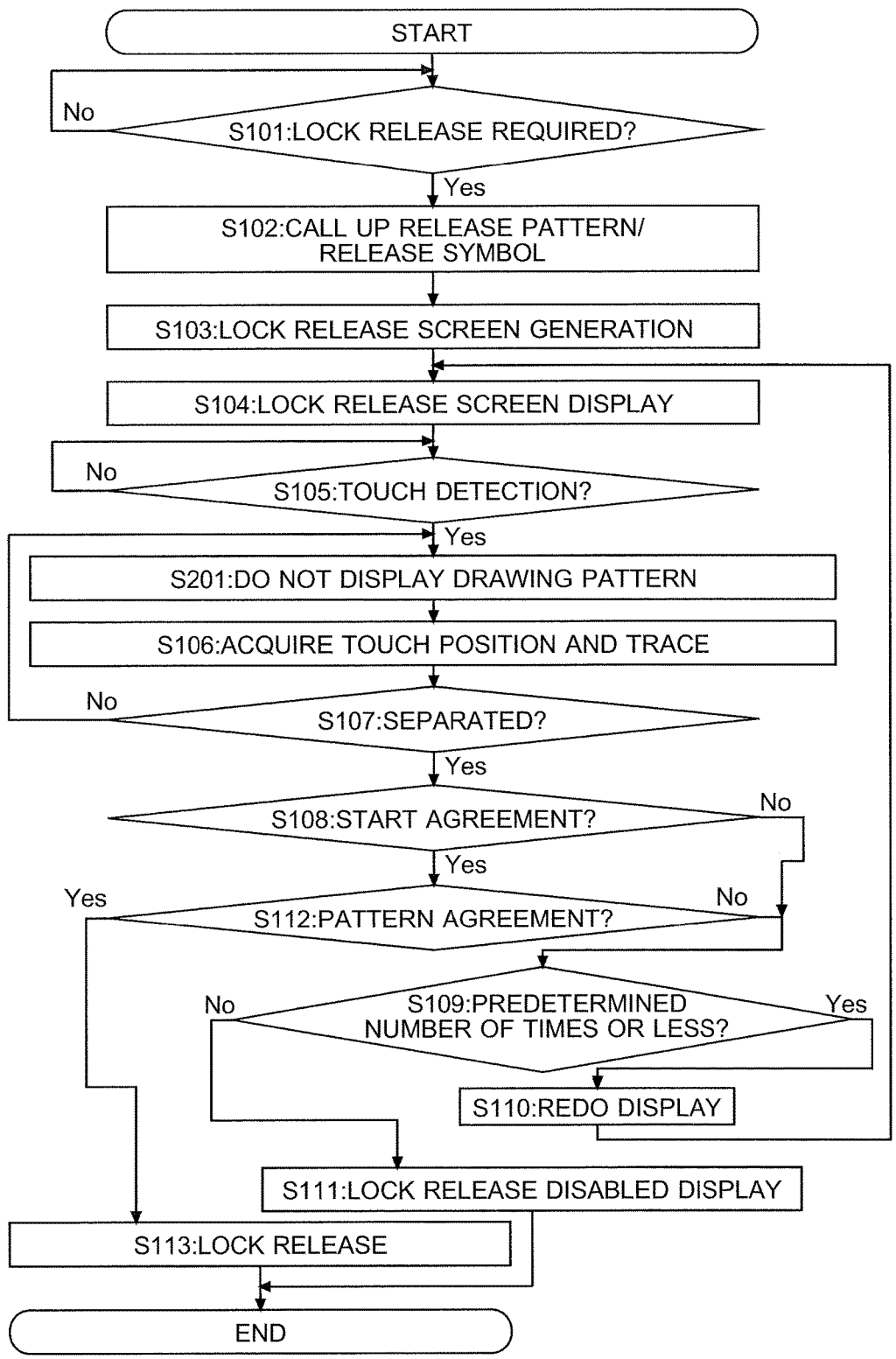
FIG. 12 is a diagram showing an example of a lock release operation of a touch operation device according to a second variation.

An example of a touch operation device 8 according to a second variation will be described. The configuration of the touch operation device 8 in the second variation is the same as that of the touch operation device 8 in the embodiment. Hence, as the names and signs of the individual portions, the same names and signs as in the embodiment are used. The detailed description of the same portions will be omitted. FIG. 12 is a diagram showing an example of an operation of releasing the lock state of the touch operation device 8 according to the second variation.

In the touch operation device 8, the release symbols Oc1 and the release pattern Op1 are combined, and thus it is possible to release the lock state. Hence, the risk of releasing the lock state by a user who is not authorized is low. However, when the lock release operation is performed, if the touch screen 81 is seen, the release symbols Oc1 may be confirmed.

Hence, in the lock release operation in the second variation, the lock release screen D12 is displayed (step S104) and then the touch is detected (yes in step S105), and thereafter the processing portion 80 (the lock control portion 801) does not display the symbols Num1 in the lock release screen D12 (step S201). The processing portion 80 (the lock control portion 801) displays the guides Gu1. The release symbols Oc1 surrounding the start position of the input pattern Tr1 are also not displayed. The symbols Num1 are not displayed, and thus even when the lock release operation is seen by another person, the release symbols Oc1 are not visually recognized. In this way, the safety of the lock release can be more enhanced.

In the second variation, when the lock release operation is redone (step S110), the flow returns to step S104. The display of the lock release screen D12 is restarted. There is no limitation to this configuration, and the processing portion 80 (the image generation portion 802) may perform the restart from the generation of the lock release screen D12 (step S103). Here, the image generation portion 802 changes the position of the start guide Gus. The image generation portion 802 may change the symbols Num1. In this way, the safety of the lock release can be more enhanced. The features other than this feature are the same as those in the embodiment.

(Third Variation)

Figure 13:
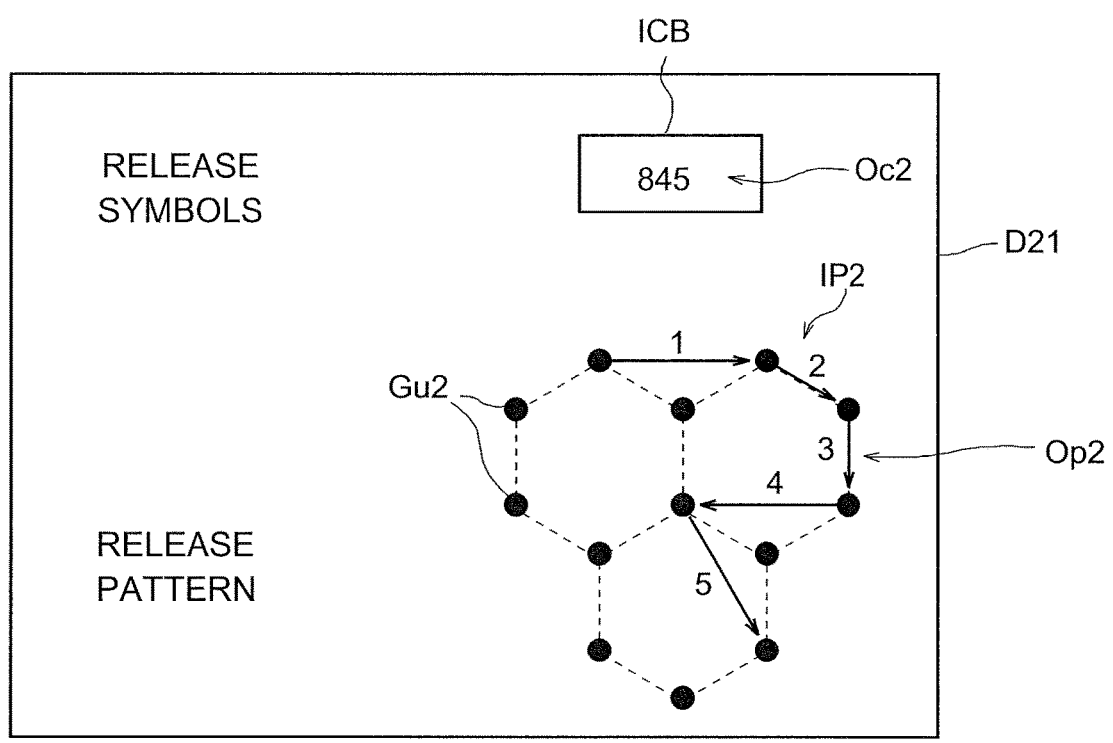
FIG. 13 is a diagram showing an example of a registration screen in a third variation.
Figure 14:
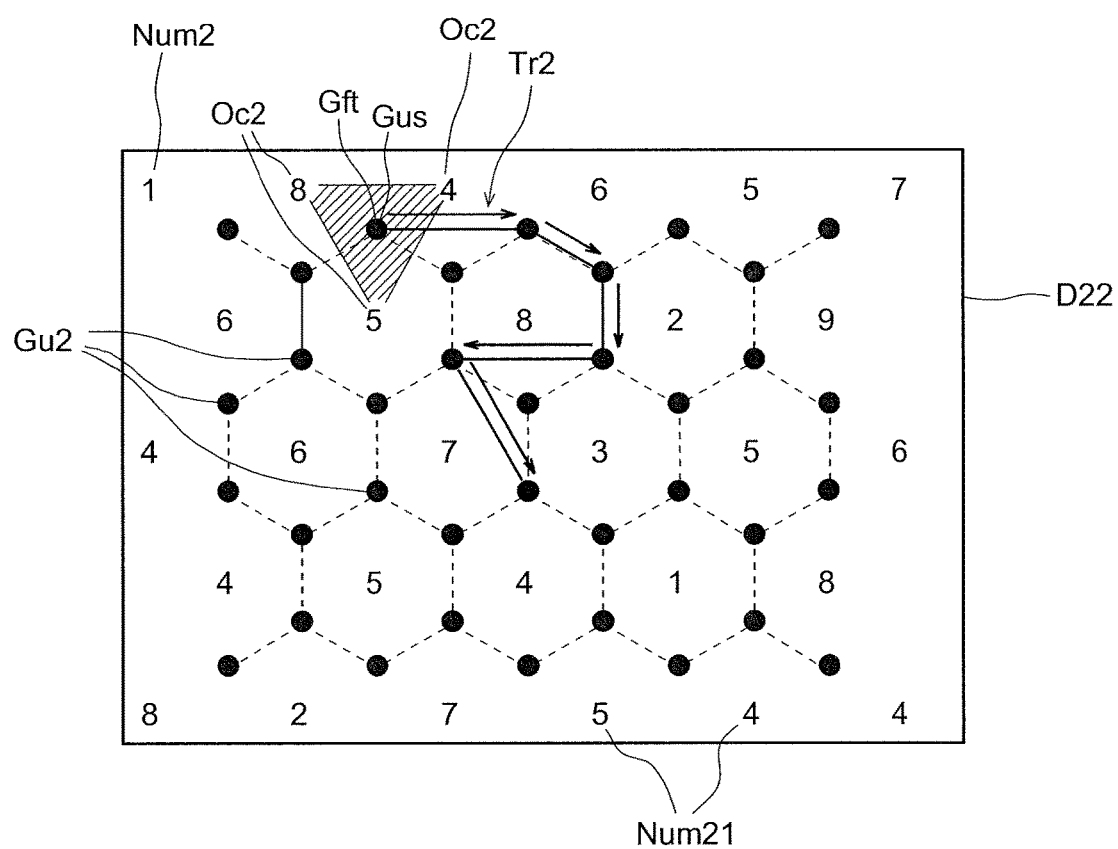
FIG. 14 is a diagram showing an example of a lock release screen in the third variation.

An example of a touch operation device 8 according to a third variation will be described. The configuration of the touch operation device 8 in the third variation is the same as that of the touch operation device 8 in the embodiment. Hence, the same names and signs as in the embodiment are basically used. The detailed description of the same portions will be omitted. FIG. 13 is a diagram showing an example of a registration screen in the third variation. FIG. 14 is a diagram showing an example of a lock release screen in the third variation.

In the embodiment and the variations described above, the examples are described where four symbols (digits) are combined as the release symbols Oc1. As shown in FIG. 13, combinations of three symbols may be used as the release symbols Oc1.

The registration screen D21 shown in FIG. 13 includes an input portion ICB and a registration guide IP2. The input portion ICB is a text box into which release symbols Oc2 are input. The registration guide IP2 is a portion into which a release pattern Opt is input. In the third variation, the release symbols Oc1 for the lock release can be set to a three-digit number. FIG. 13 shows the example where "845" are registered as the release symbols Oc2.

The registration guide IP2 has a shape in which guides Gu2 are arranged in the positions of the vertexes of six regular hexagons that are arranged without any gap therebetween. The guides Gu2 are arranged such that two vertexes of the regular hexagon are overlaid on the two vertexes of the regular hexagon adjacent thereto. In FIGS. 13 and 14, the imaginary regular hexagons are shown by broken lines. The broken lines may or may not be displayed. The user traces the top of the touch screen 81 with the finger. The user connects the guides Gu2 together. The user inputs (generates) the trace of the figure as a release pattern Op2 to the touch screen 81. The registration screen D21 is an example. Configurations in which the release symbols and the release pattern can be registered can be widely adopted.

The image generation portion 802 generates (the image data of) a lock release screen D22 where the guides Gu2 are arranged in the positions of the vertexes of regular hexagons which are arranged without any gap therebetween (and whose sides are overlaid). The image generation portion 802 generates (the image data of) the lock release screen D22 in which symbols Num2 are arranged in the positions of the centers of the regular hexagons. In other words, the symbols Num2 are arranged in the positions of the vertexes of regular triangles which are arranged without any gap therebetween. The guides Gu2 are arranged in the positions of the centers of the regular triangles. The image generation portion 802 sets one of the guides Gu2 to the start guide Gus. The image generation portion 802 may set the position of the start guide Gus to a different position each time the image generation portion 802 generates the image data of the lock release screen D22. The image generation portion 802 generates (the image data of) the lock release screen D22 in which three symbols surrounding the start guide Gus agree with the release symbols Oc2.

The processing portion 80 (the image generation portion 802) recognizes the number of symbols (the number of the dummy symbols Num21) arranged around the guides Gu2 other than the start guide Gus. Specifically, in the case of the lock release screen D22 of FIG. 14, the processing portion 80 (the image generation portion 802) includes 28 symbols (digits). Among the 28 symbols, three symbols are the release symbols Oc2. The processing portion 80 (the image generation portion 802) subtracts the number of symbols in the release symbols Oc2 from the total number of symbols Num2 included in the lock release screen D22 so as to recognize the number of symbols (the number of the dummy symbols Num21). The processing portion 80 (the image generation portion 802) determines the values of the dummy symbols Num21. The value is a one-digit number. The processing portion 80 (the image generation portion 802) determines the symbols Num2 with a predetermined algorithm. The algorithm in which the values (digits) determined are prevented from being biased is adopted. The processing portion 80 (the image generation portion 802) arranges, in the arrangement position of the dummy symbol Num21, any one of the values of the dummy symbols Num21 which are determined. In this way, the arrangement positions of the individual symbols are determined. The processing portion 80 (the image generation portion 802) generates the image data of the lock release screen D22 which includes the release symbols Oc1 and the dummy symbols Num21. As described above, even when the release symbols in which three symbols are combined are used, the safety of the lock release operation can be enhanced. The features other than this feature are the same as those in the first embodiment.

(Fourth Variation)

Figure 15:
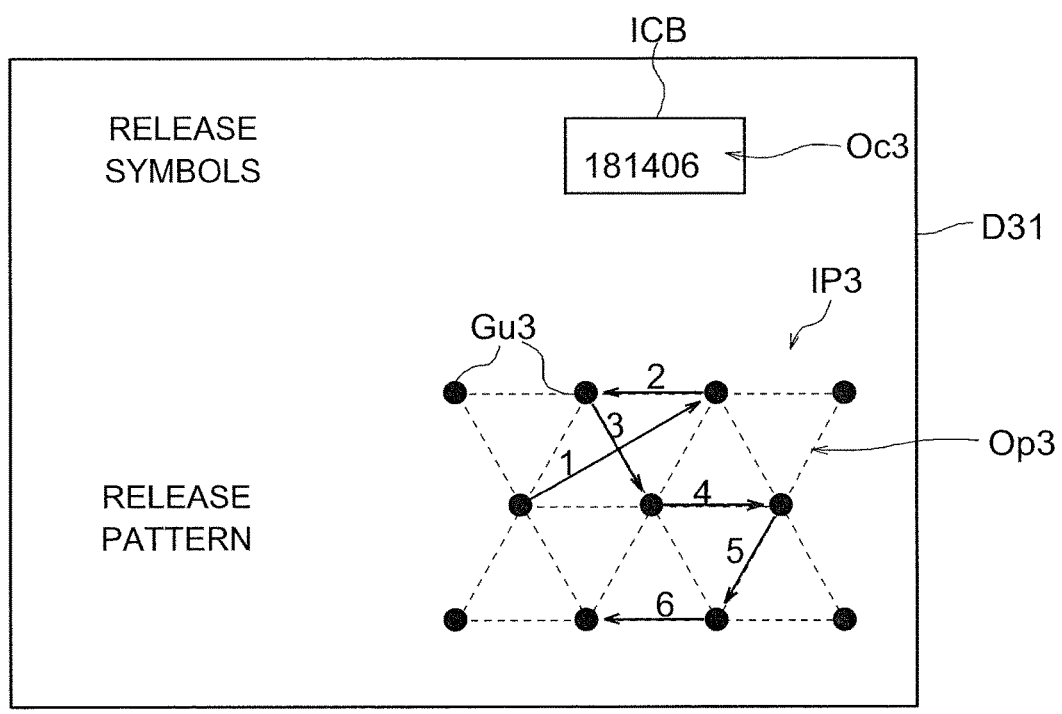
FIG. 15 is a diagram showing an example of a registration screen in a fourth variation.
Figure 16:
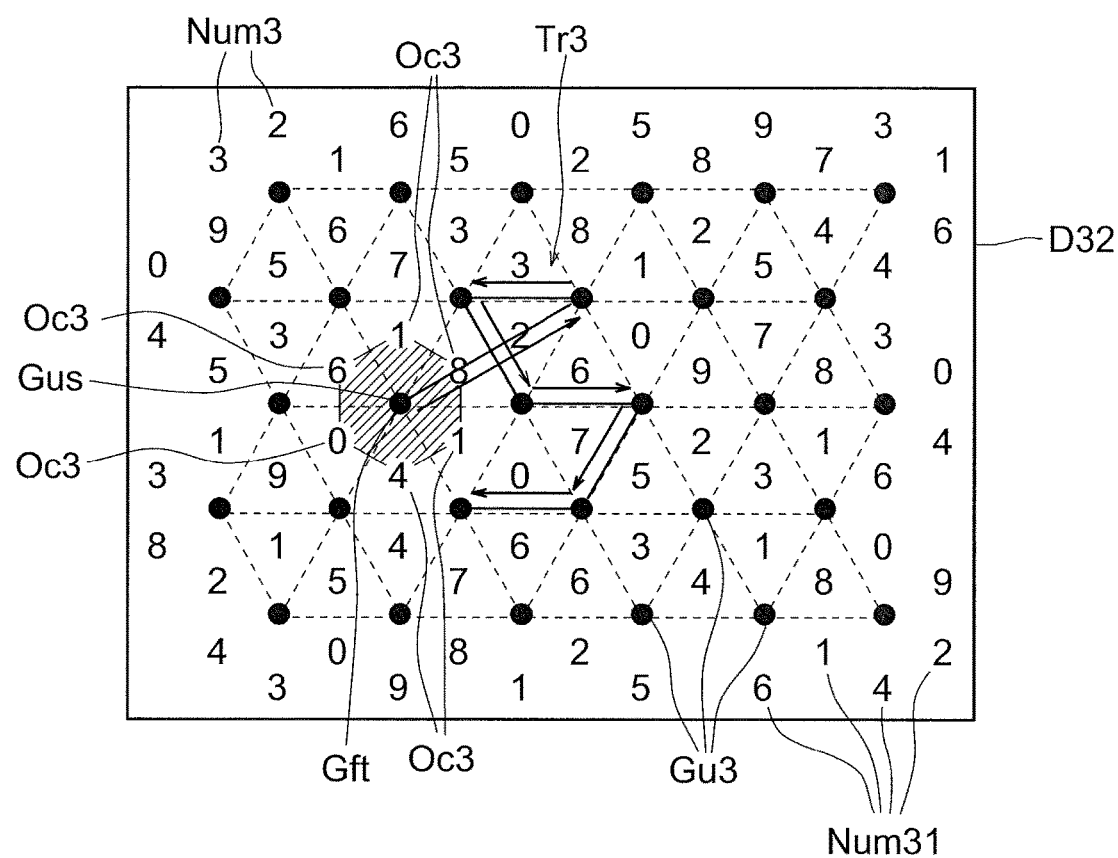
FIG. 16 is a diagram showing an example of a lock release screen in the fourth variation.

An example of a touch operation device 8 according to a fourth variation will be described. The configuration of the touch operation device 8 in the fourth variation is the same as that of the touch operation device 8 in the embodiment. Hence, the same names and signs as in the embodiment are basically used. The detailed description of the same portions will be omitted. FIG. 15 is a diagram showing an example of a registration screen in the fourth variation. FIG. 16 is a diagram showing an example of a lock release screen in the fourth variation.

In the embodiment and the variations described above, the examples are described where combinations of four symbols (digits) are used as the release symbols Oc1. As shown in FIG. 15, combinations of six symbols may be used.

The registration screen D31 shown in FIG. 15 includes an input portion ICB and a registration guide IP3. The input portion ICB is a text box into which release symbols Oc3 are input. The registration guide IP3 is a portion into which a release pattern Op3 is input. FIG. 15 shows the example where the release symbols Oc3 for the lock release are set to a six-digit number. FIG. 15 shows the example where "181406" are registered as the release symbols Oc3.

The registration guide IP3 includes guides Gu3 which are arranged in the positions of the vertexes of regular triangles that are arranged without any gap therebetween (and which are arranged such that one side of the regular triangle is overlaid on one side of the regular triangle adjacent thereto). In FIGS. 15 and 16, the imaginary regular triangles are shown by broken lines. The user traces the top of the touch screen 81 with the finger. The user traces it so as to connect the guides Gu3 together. The user inputs (generates) the trace of the connection of the guides Gu3 as the release pattern Op3. The registration screen D31 is an example. Configurations in which the release symbols and the release pattern can be registered can be widely adopted.

The image generation portion 802 generates (the image data of) the lock release screen D32 in which the guides Gu3 are arranged in the positions of the vertexes of regular triangles that are arranged without any gap therebetween. One side of the regular triangle is overlaid on one side of the regular triangle adjacent thereto. The image generation portion 802 generates (the image data of) the lock release screen D32 in which symbols Num3 are arranged in the positions of the centers of the regular triangles. In other words, the symbols Num3 are arranged in the positions of the vertexes of regular hexagons which are arranged without any gap therebetween. The guides Gu3 are arranged in the positions of the centers of the regular hexagons. The image generation portion 802 generates (the image data of) the lock release screen D32 in which one of the guides Gu3 is set to the start guide Gus. The image generation portion 802 may set the position of the start guide Gus to a different position each time the image generation portion 802 generates the image data of the lock release screen D32. The image generation portion 802 generates (the image data of) the lock release screen D32 in which six symbols surrounding the start guide Gus are set to the release symbols Oc3.

The processing portion 80 (the image generation portion 802) recognizes the number of symbols (the number of the dummy symbols Num31) arranged around the guides Gu3 other than the start guide Gus. Specifically, in the case of the lock release screen D32 of FIG. 16, the processing portion 80 (the image generation portion 802) includes 82 symbols (digits). Among the 82 symbols, three symbols are the release symbols Oc3. The processing portion 80 (the image generation portion 802) subtracts the number of symbols in the release symbols Oc3 from the total number of symbols Num3 included in the lock release screen D32 so as to recognize the number of symbols (the number of dummy symbols Num31). The processing portion 80 (the image generation portion 802) determines the values of the dummy symbols Num31. The value is a one-digit number. The processing portion 80 (the image generation portion 802) determines the symbols Num3 with a predetermined algorithm. The algorithm in which the values (digits) determined are prevented from being biased is adopted. The processing portion 80 (the image generation portion 802) arranges, in the arrangement position of the dummy symbol Num31, any one of the values of the dummy symbols Num31 which are determined. In this way, the arrangement positions of the individual symbols are determined. The processing portion 80 (the image generation portion 802) generates the image data of the lock release screen D32 which includes the release symbols Oc3 and the dummy symbols Num31. As described above, even when the release symbols in which six symbols are combined are used, the safety of the lock release operation can be enhanced. The features other than this feature are the same as those in the embodiment.

Any one of the combination of three symbols (three-digit number), the combination of four symbols (four-digit number) and the combination of six symbols can be stored as the release symbols. The processing portion 80 (the lock control portion 801) may switch the lock release screens according to the release symbols. For example, the user may set the number of symbols. According to the number of symbols included in the release symbols, the function to be released may be made different (a restriction is provided in an accessible function).

(Fifth Variation)

Figure 17:
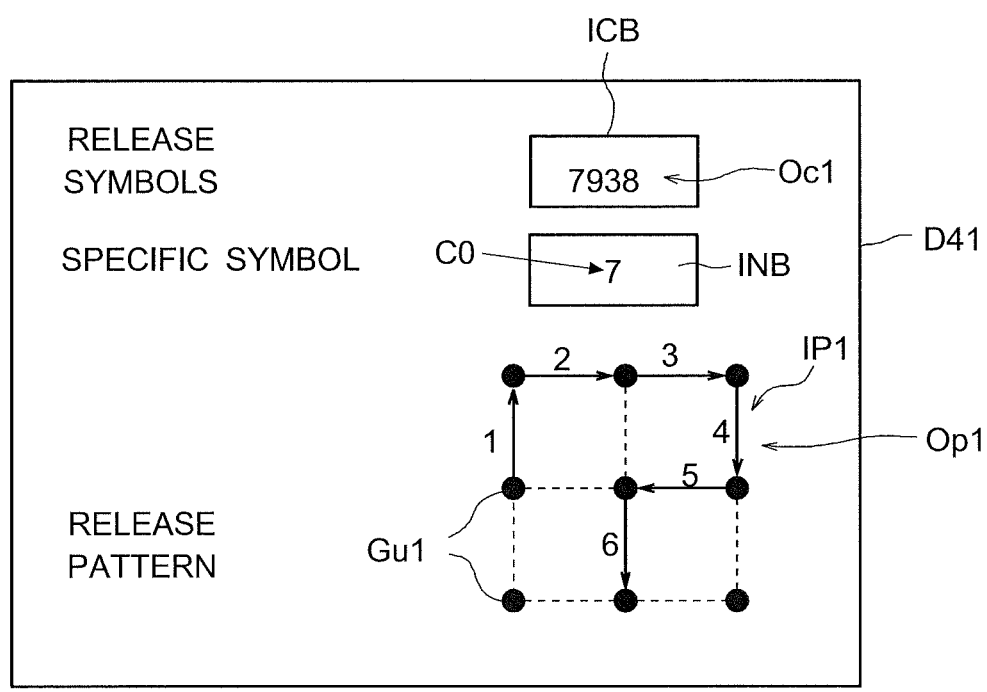
FIG. 17 is a diagram showing an example of a registration screen in a fifth variation.
Figure 18:
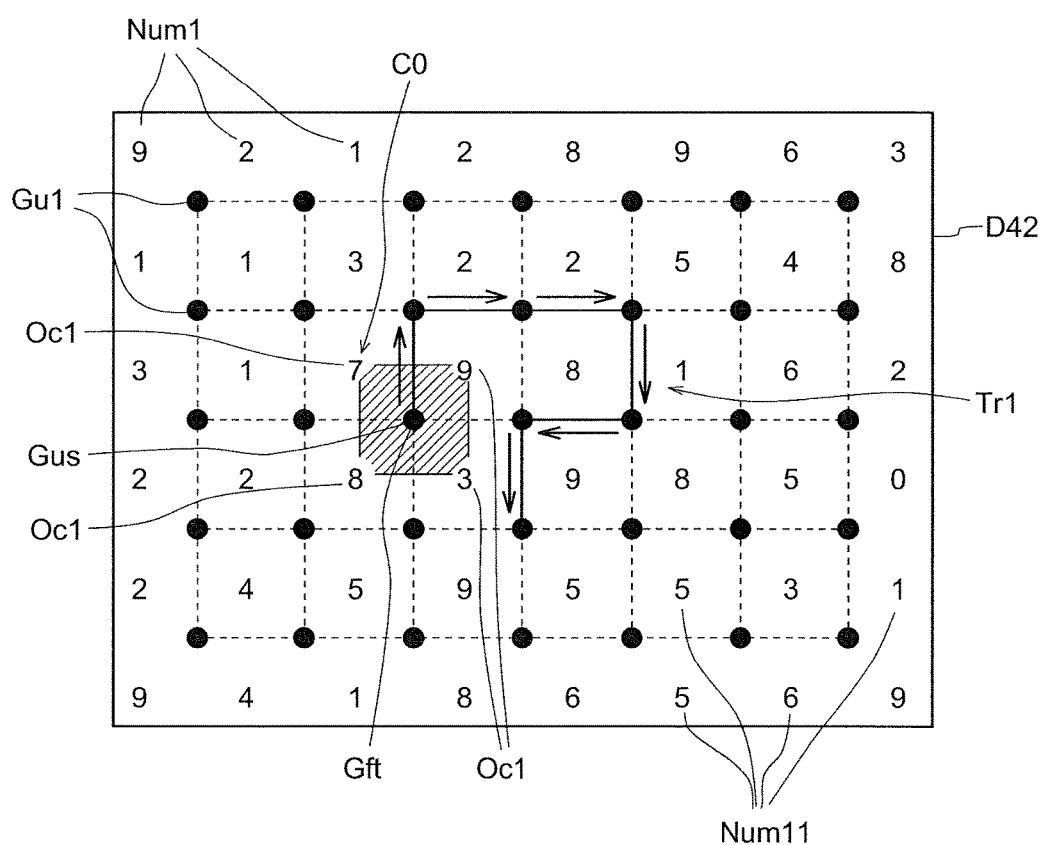
FIG. 18 is a diagram showing an example of a lock release screen in the fifth variation.

An example of a touch operation device 8 according to a fifth variation will be described. The configuration of the touch operation device 8 in the fifth variation is the same as that of the touch operation device 8 in the embodiment. Hence, the same names and signs as in the embodiment are basically used. The detailed description of the same portions will be omitted. FIG. 17 is a diagram showing an example of a registration screen D41 in the fifth variation. FIG. 18 is a diagram showing an example of a lock release screen D42 in the fifth variation.

FIG. 17 shows the example of the registration screen D41. As in the embodiment and the variations described above, the registration screen D41 is a screen for registering the release symbols Oc1 and the release pattern Op1. As in the embodiment, FIG. 17 shows the registration screen D41 that is the type of registration screen into which a four-digit number is input. The fifth variation can be applied to the embodiment and the second to fourth variations.

The touch operation device 8 receives the input of the release symbols Oc1 and the release pattern Op1. An input method is the same as in the embodiment and the variations described above. The processing portion 80 (the lock control portion 801) makes the storage portion 82 store the release symbols Oc1 which are input. The processing portion 80 (the lock control portion 801) makes the storage portion 82 store the release pattern Op1 which is input.

In the registration screen D41, a specific symbol input portion INB is provided. For example, when the specific symbol input portion INB is touched, the processing portion 80 makes the display portion 811 display a software keyboard for input of symbols. The input of symbols is performed with the touch screen 81. The input of symbols may be performed with the hard keys 61. As described above, the touch screen 81 receives an operation of selecting a specific symbol C0. The user can set a desired symbol to the specific symbol C0. For example, the user can set, to the specific symbol C0, a symbol which the user thinks is lucky. The image generation portion 802 recognizes the symbol selected on the touch screen 81 as the specific symbol C0.

The specific symbol C0 is any one of the release symbols Oc1 which are input. The user may set the first symbol of a plurality of release symbols Oc1 to the specific symbol C0. The user may set the last symbol of the release symbols Oc1 to the specific symbol C0. The user may set any of the symbols between the first symbol and the last symbol in the release symbols Oc1 to the specific symbol C0. FIG. 17 shows the example where the first symbol of "7" in the release symbols Oc1 is registered as the specific symbol C0. The processing portion 80 (the lock control portion 801) makes the storage portion 82 store the specific symbol C0 which is input.

When the lock release is required in the lock state, the lock control portion 801 calls up the release pattern Op1 and the release symbols Oc1 from the release pattern data 821 and the release symbol data 822. The lock control portion 801 calls up the specific symbol C0 which is stored (registered). The lock control portion 801 transmits the release symbols Oc1 and the specific symbol C0 to the image generation portion 802. In this way, the image generation portion 802 recognizes the specific symbol C0 included in the release symbols Oc1. The image generation portion 802 generates the lock release screen D12 based on the release symbols Oc1 and the specific symbol C0.

FIG. 18 shows the example of the lock release screen D42 in the fifth variation which is generated by the image generation portion 802. As shown in FIG. 18, the processing portion 80 (the image generation portion) generates the lock release screen D42 in which only one specific symbol C0 is included and in which the specific symbol C0 is arranged around the start guide Gus.

The arrangement of the guides Gu1, the release symbols Oc1 and the dummy symbols Num11 (the symbols other than the release symbols Oc1) is the same as in the embodiment. In FIG. 18, imaginary squares are shown by broken lines. The broken lines may or may not be displayed.

The processing portion 80 (the image generation portion 802) sets one of the guides Gu1 to the start guide Gus. The image generation portion 802 may set the position of the start guide Gus to a different position each time the image generation portion 802 generates the image data of the lock release screen D42. In FIG. 18, the guide which is the third from the top and which is the third from the left is the start guide Gus. In FIG. 18, in order for the position thereof to be clarified, the surrounding of the start guide Gus is hatched (in the actual screen, the surrounding is not hatched).

As in the embodiment, the processing portion 80 (the image generation portion 802) respectively arranges the symbols of "7", "9", "3" and "8" in the release symbols Oc1 on the "upper left" side, the "upper right" side, the "lower right" side and the "lower left" side of the start guide Gus.

The processing portion 80 (the image generation portion 802) arranges the specific symbol C0 around the start guide Gus according to the position of the specific symbol C0 in the release symbols Oc1.

The processing portion 80 (the image generation portion 802) recognizes the number of the dummy symbols Num11 arranged around the guides Gu1 other than the start guide Gus. In the case of the lock release screen D42 of FIG. 18, the processing portion 80 (the image generation portion 802) includes 48 symbols (digits). Among the 48 symbols, four symbols are the release symbols Oc1. The processing portion 80 (the image generation portion 802) subtracts the number of symbols in the release symbols Oc1 from the total number of symbols Num1 included in the lock release screen D42 so as to recognize the number of symbols (the number of the dummy symbols Num11).

The processing portion 80 (the image generation portion 802) determines the values (digits) of the dummy symbols Num11. The processing portion 80 (the image generation portion 802) determines the symbols Num1 with a predetermined algorithm. The algorithm in which the values (digits) determined are prevented from being biased is adopted. The algorithm in which the values are randomly selected with a predetermined method is used. Here, the processing portion 80 (the image generation portion 802) makes a setting such that the values (digits) of the dummy symbols Num11 are prevented from being the same as the specific symbol C0. Then, the processing portion 80 (the image generation portion 802) arranges, in the arrangement position of the dummy symbols Num11, any one of the values of the dummy symbols Num11 which are determined. In this way, the arrangement positions of the individual symbols are determined.

Through the process described above, the processing portion 80 (the image generation portion 802) generates the image data of the lock release screen D42 as follows. The image generation portion 802 arranges the symbols Num1 in the positions of the vertexes of squares which have the same shape and which are spread. The image generation portion 802 arranges the guides Gu1 in the centers of the squares. The image generation portion 802 surrounds the start guide Gus with the same symbols as the release symbols Oc1 The image generation portion 802 prevents the symbols (the dummy symbols Num11) surrounding the other guides Gu1 from agreeing with the release symbols Oc1. The image generation portion 802 includes only one specific symbol C0 in the lock release screen D42. Thereafter, the input of the input pattern Tr1 by the user is performed. The same lock release processing as in the embodiment is performed.

When a plurality of symbols included in the release symbols Oc1 are included in the lock release screen D42, it may be difficult to find the start guide Gus. Since only one specific symbol C0 is included in the lock release screen D42, it is possible to easily find the start guide Gus.

The release symbols Oc1 may include a plurality of symbols which are the same as the specific symbol C0. For example, when the release symbols Oc1 are "1811", and the specific symbol C0 is the first symbol of "1", the release symbols Oc1 include a total of three symbols which are the same as the specific symbol C0. In this case, in order to surround the start guide Gus with the release symbols Oc1, it is necessary to include a plurality of specific symbols C0 in the lock release screen D42.

Hence, the processing portion 80 (the image generation portion 802) recognizes a same symbol number which is the number of symbols which are the same as the specific symbol C0 which is included in the release symbols Oc1. The processing portion 80 (the image generation portion 802) generates the image data of the lock release screen D42 in which only the same number of specific symbols C0 as the same symbol number are included and in which the specific symbols C0 are arranged around the start guide Gus. For example, when the release symbols Oc1 include a total of two symbols which are the same as the specific symbol C0, the image generation portion 802 generates the image data of the lock release screen D42 in which the two specific symbols C0 are included. When the same symbol number is one, the image generation portion 802 includes one specific symbol C0 in the lock release screen D42. In other words, when the release symbols Oc1 do not include the same symbol as the specific symbol C0, the image generation portion 802 includes only one specific symbol C0 in the lock release screen D42.

When the specific symbol C0 is not set in the specific symbol input portion INB, the processing portion 80 (the image generation portion 802) generates the image data of the lock release screen D42 in which, for each of the symbols included in the release symbols Oc1, a plurality of symbols are included. In other words, according to whether or not the specific symbol C0 is input into the specific symbol input portion INB, it is possible to select whether or not only one specific symbol C0 is included in the lock release screen D42.

(Sixth Variation)

Figure 19:
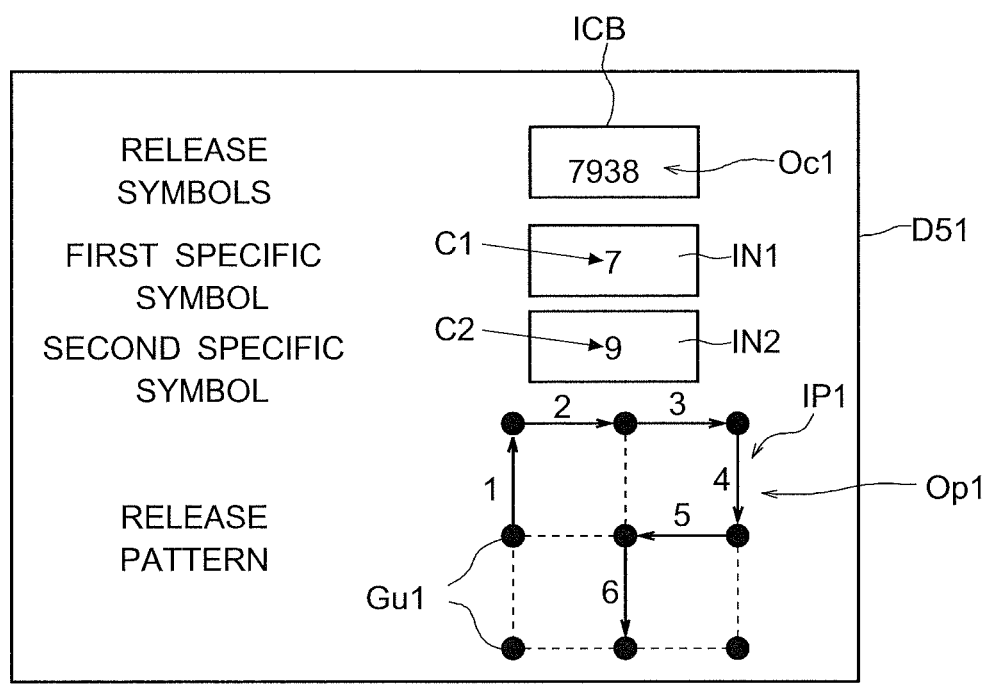
FIG. 19 is a diagram showing an example of a registration screen in a sixth variation.
Figure 20:
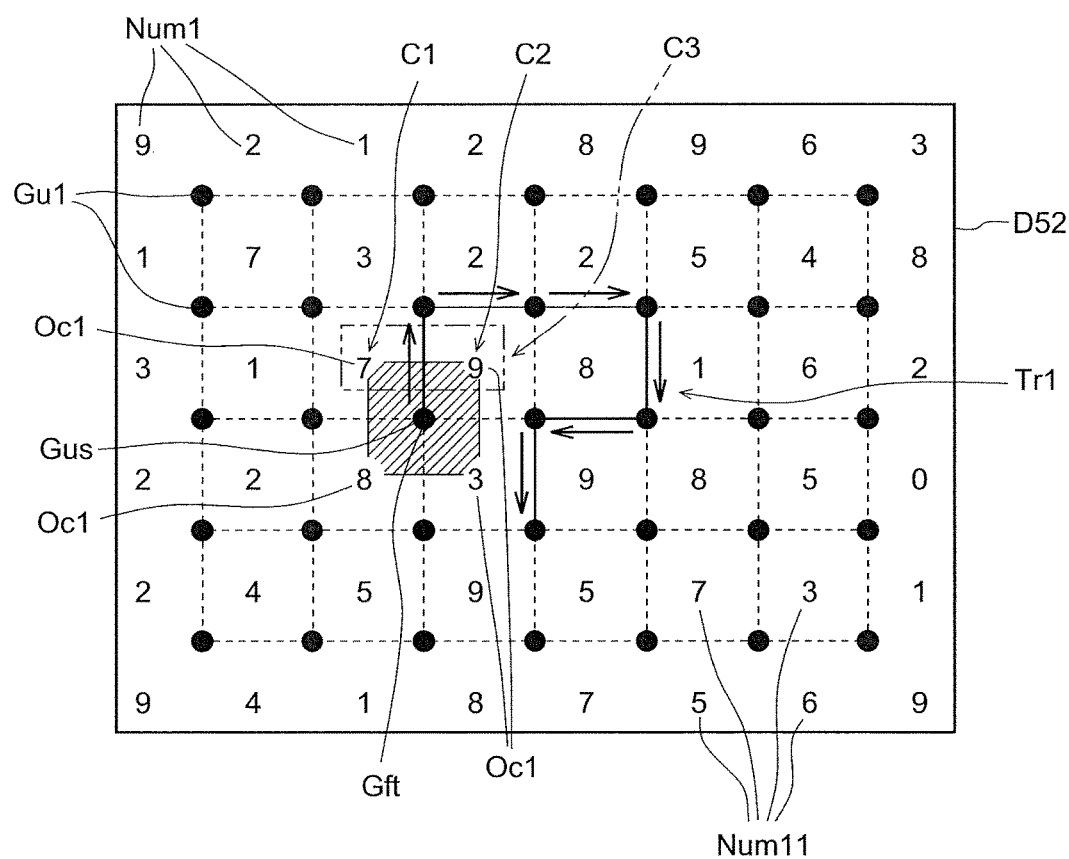
FIG. 20 is a diagram showing an example of a lock release screen in the sixth variation.

An example of a touch operation device 8 according to a sixth variation will be described. The configuration of the touch operation device 8 in the sixth variation is the same as that of the touch operation device 8 in the embodiment. Hence, the same names and signs as in the embodiment are basically used. The detailed description of the same portions will be omitted. FIG. 19 is a diagram showing an example of a registration screen D51 in the sixth variation. FIG. 20 is a diagram showing an example of a lock release screen D52 in the sixth variation.

FIG. 19 shows the example of the registration screen D51. As in the embodiment and the variations described above, the registration screen D51 is a screen for registering the release symbols Oc1 and the release pattern Op1. As in the embodiment, FIG. 19 shows the registration screen D51 that is the type of registration screen into which a four-digit number is input as the release symbol Oc1. The sixth variation can be applied to the embodiment and the second to fourth variations.

The touch operation device 8 receives the input of the release symbols Oc1 and the release pattern Opt. An input method is the same as in the embodiment and the variations described above. The processing portion 80 (the lock control portion 801) makes the storage portion 82 store the release symbols Oc1 which are input. The processing portion 80 (the lock control portion 801) makes the storage portion 82 store the release pattern Op1 which is input.

In the registration screen D51, a first specific symbol input portion IN1 and a second specific symbol input portion IN2 are provided. For example, when the first specific symbol input portion IN1 is touched, the processing portion 80 makes the display portion 811 display a software keyboard for input of symbols. When the second specific symbol input portion IN2 is also touched, the processing portion 80 makes the display portion 811 display the software keyboard for input of symbols. The input of symbols is performed with the touch screen 81. The input of symbols may be performed with the hard keys 61. As described above, the touch screen 81 receives an operation of selecting a first specific symbol C1 and a second specific symbol C2. The user can set desired symbols to the first specific symbol C1 and the second specific symbol C2. The image generation portion 802 recognizes the symbol selected on the touch screen 81 as the first specific symbol C1. The image generation portion 802 also recognizes the symbol selected on the touch screen 81 as the second specific symbol C2.

The first specific symbol C1 is any one of the release symbols Oc1 which are input. The second specific symbol C2 is also any one of the release symbols Oc1 which are input. However, the first specific symbol C1 and the second specific symbol C2 are symbols which are different from each other. FIG. 19 shows the example where the first symbol of "7" in the release symbols Oc1 is registered as the first specific symbol C1. FIG. 19 also shows the example where the second symbol of "9" in the release symbols Oc1 is registered as the second specific symbol C2. The processing portion 80 (the lock control portion 801) makes the storage portion 82 store the first specific symbol C1 and the second specific symbol C2 which are input.

When the lock release is required in the lock state, the lock control portion 801 calls up the release pattern Op1 and the release symbols Oc1 from the release pattern data 821 and the release symbol data 822. The lock control portion 801 calls up the first specific symbol C1 and the second specific symbol C2 which are stored (registered). The lock control portion 801 transmits the release symbols Oc1, the first specific symbol C1 and the second specific symbol C2 to the image generation portion 802. In this way, the image generation portion 802 recognizes the first specific symbol C1 and the second specific symbol C2 included in the release symbols Oc1. The image generation portion 802 generates the lock release screen D12 based on the release symbols Oc1, the first specific symbol C1 and the second specific symbol C2.

FIG. 20 shows the example of the lock release screen D52 in the sixth variation which is generated by the image generation portion 802. As shown in FIG. 20, the processing portion 80 (the image generation portion) generates the lock release screen D52 in which only one specific symbol arrangement part C3 where the first specific symbol C1 and the second specific symbol C2 are adjacent to each other is included and in which the first specific symbol C1 and the second specific symbol C2 are arranged around the start guide Gus.

The arrangement of the guides Gu1, the release symbols Oc1 and the dummy symbols Num11 (the symbols other than the release symbols Oc1) is the same as in the embodiment. In FIG. 20, imaginary squares are shown by broken lines. The broken lines may or may not be displayed.

The processing portion 80 (the image generation portion 802) sets one of the guides Gu1 to the start guide Gus. The image generation portion 802 may set the position of the start guide Gus to a different position each time the image generation portion 802 generates the image data of the lock release screen D52. In FIG. 20, the guide which is the third from the top and which is the third from the left is the start guide Gus. In FIG. 20, in order for the position thereof to be clarified, the surrounding of the start guide Gus is hatched (in the actual screen, the surrounding is not hatched).

As in the embodiment, the processing portion 80 (the image generation portion 802) respectively arranges the symbols of "7", "9", "3" and "8" in the release symbols Oc1 on the "upper left" side, the "upper right" side, the "lower right" side and the "lower left" side of the start guide Gus. The processing portion 80 (the image generation portion 802) arranges the first specific symbol C1 and the second specific symbol C2 around the start guide Gus according to the positions of the first specific symbol C1 and the second specific symbol C2 in the release symbols Oc1.

The processing portion 80 (the image generation portion 802) recognizes the number of symbols (the number of the symbols Num11) arranged around the guides Gu1 other than the start guide Gus. In the case of the lock release screen D52 of FIG. 20, the processing portion 80 (the image generation portion 802) includes 48 symbols (digits). Among the 48 symbols, four symbols are the release symbols Oc1. The processing portion 80 (the image generation portion 802) subtracts the number of symbols in the release symbols Oc1 from the total number of symbols Num1 included in the lock release screen D52 so as to recognize the number of symbols (the number of the dummy symbols Num11).

The processing portion 80 (the image generation portion 802) determines the values (digits) of the dummy symbols Num11. The processing portion 80 (the image generation portion 802) determines the symbols Num1 with a predetermined algorithm. The algorithm in which the values (digits) determined are prevented from being biased is adopted. The algorithm in which the values are randomly selected with a predetermined method is used. Here, the processing portion 80 (the image generation portion 802) makes a setting such that the first specific symbol C1 and the second specific symbol C2 are prevented from being adjacent to each other in a vertical direction or in a lateral direction. Then, the processing portion 80 (the image generation portion 802) arranges, in the arrangement position of the dummy symbol Num11, any one of the values of the dummy symbols Num11 which are determined. In this way, the arrangement positions of the individual symbols are determined.

Through the process described above, the processing portion 80 (the image generation portion 802) generates the image data of the lock release screen D52 as follows. The image generation portion 802 arranges the symbols Num1 in the positions of the vertexes of squares which have the same shape and which are spread. The image generation portion 802 arranges the guides Gu1 in the centers of the squares. The image generation portion 802 surrounds the start guide Gus with the same symbols as the release symbols Oc1. The image generation portion 802 generates the image data of the release screen D52 in which only the one specific symbol arrangement part C3 where the first specific symbol C1 and the second specific symbol C2 are adjacent to each other is included. Thereafter, the input of the input pattern Tr1 by the user is performed. The same lock release processing as in the embodiment is performed.

When a plurality of symbols included in the release symbols Oc1 are included in the lock release screen D52, it may be difficult to find the start guide Gus. The image data of the lock release screen D52 is generated such that only the one specific symbol arrangement part C3 is included. In this way, only the one specific symbol arrangement part C3 is included in the lock release screen D52. A combination of the first specific symbol C1 and the second specific symbol C2 is found, and thus it is possible to easily find the start guide Gus.

When the first specific symbol C1 and the second specific symbol C2 are not set in the first specific symbol input portion IN1 and the second specific symbol input portion IN2, the processing portion 80 (the image generation portion 802) generates the image data of the lock release screen D52 in which, for each of the symbols included in the release symbols Oc1, a plurality of symbols are included. In other words, according to whether or not the first specific symbol C1 and the second specific symbol C2 are input into the first specific symbol input portion IN1 and the second specific symbol input portion IN2, it is possible to select whether or not only one specific symbol arrangement part C3 is included in the lock release screen D52.

The touch operation device 8 according to the embodiment and the variations includes the lock control portion 801, the image generation portion 802, the touch screen 81 and the storage portion 82. The lock control portion 801 controls the operation of the lock state and the lock release that is a predetermined function. The image generation portion 802 generates the lock release screen (D12, D121, D22, D32, D42, D52) for the lock release. The touch screen 81 displays the generated lock release screen and can detect the touch operation. The storage portion 82 stores the release pattern (Op1, Op2, Op3) which is previously registered and the release symbols (Oc1, Oc2, Oc3) in which a plurality of symbols are combined. The image generation portion 802 includes a plurality of guides (Gu1, Gu2, Gu3) in the lock release screen. The image generation portion 802 arranges the guides according to a predetermined rule. The image generation portion 802 includes a plurality of symbols in the lock release screen. The image generation portion 802 arranges the symbols (Num1, Num2, Num3, Chr1) around the guides at regular intervals. The image generation portion 802 includes one of the guides which is set to the start guide Gus in the lock release screen. The image generation portion 802 generates the lock release screen in which the release symbols are arranged around the start guide Gus. The lock control portion 801 acquires the input pattern (Tr1, Tr2, Tr3) which is a trace of the touch operation of connecting the guides together. The lock control portion 801 releases the lock state when the lock control portion 801 confirms that in the input pattern, the guide on which the touch operation is first performed agrees with the start guide Gus and that the shape of the input pattern agrees with the shape of the release pattern.

A lock release portion confirms whether the first guide of the input pattern in the lock release screen agrees with the start guide. The lock release portion confirms whether or not the user knows the release symbols. Then, the lock release portion confirms whether the input pattern agrees with the release pattern so as to confirm whether or not the user knows the lock pattern. In the touch operation device according to the embodiment, even when another person sees the operation of the lock release so as to know the release pattern, it is difficult to release the lock state only by knowing the release pattern. In this way, it is possible to enhance the safety for information leakage and unauthorized use.

The image generation portion 802 newly generates the lock release screen in which the position of the start guide Gus is set to a different position each time the lock release screen (D12, D121, D22, D32, D42, D52) is displayed on the touch screen 81. In this way, it is possible to enhance the safety for information leakage and unauthorized use.

The order in which the symbols included in the release symbols (Oc1, Oc2, Oc3) are arranged is determined. The image generation portion 802 generates the lock release screen (D12, D121, D22, D32, D42, D52) in which the start guide Gus is surrounded by the release symbols in the order of the arrangement that is determined. It is possible to easily distinguish between the start guide (Gus) and the other guides (Gu1). It is possible to easily perform the lock release operation.

When the lock control portion 801 detects the touch operation after the lock release screen (D12, D121, D22, D32, D42, D52) is displayed, the image generation portion 802 does not display all the symbols included in the lock release screen. Even when another person steals the input of the input pattern (Tr1, Tr2, Tr3), it is possible to prevent the release symbols (Oc1) from being easily known. In this way, it is possible to enhance the safety for information leakage and unauthorized use. Each time the lock release screen is displayed on the touch screen 81, the position of the start guide Gus and the arrangement of the symbols (Num1) may be changed. For example, even when the position of the first guide Gft in a certain lock release screen is known, since the start guide (Gus) is replaced, it is difficult to release the lock state in an unauthorized manner. It is possible to enhance the safety for information leakage and unauthorized use.

In the configuration described above, the image generation portion 802 generates the lock release screen (D12, D121, D22, D32, D42, D52) in which the guides are disposed in an arrangement that is determined according to the number of symbols included in the release symbols (Oc1, Oc2, Oc3). The rule of the arrangement of the guides in the lock release screen may be changed based on the number of symbols included in the release symbols. For the user, the range of the setting of the release symbols is extended. For example, a configuration may be adopted in which it is possible to select the release symbols from any one of the release symbols (three-digit number) consisting of three symbols, the release symbols (four-digit number) consisting of four symbols and the release symbols (six-digit number) consisting of six symbols. The range of the selection of the release symbols is extended. The release symbols consisting of five symbols, the release symbols consisting of seven symbols and the like cannot be used as the release symbols in which all the symbols are utilized. Part thereof is used, and thus it is possible to utilize them. For example, when the release symbols including five symbols are utilized, a configuration may be adopted in which one symbol is set to any symbol and in which the five symbols are dealt with as the release symbols including the six symbols. A configuration may be adopted in which one symbol is not used and in which the five symbols are dealt with as the release symbols including the four symbols.

The release symbols (Oc1, Oc2, Oc3) may include a plurality of symbols and a character. The release symbols (Oc1, Oc2, Oc3) may include a plurality of symbols and a digit. Examples of the symbols can include digits, characters and narrowly defined symbols. As the characters, in addition to digits and letters of the alphabet, unique characters in a language used by the user (for example, hiragana, katakana and Chinese characters) may be used.

The image generation portion 802 recognizes the specific symbol C0 which is any one of the symbols included in the release symbols (Oc1, Oc2, Oc3). The image generation portion 802 generates the lock release screen (D12, D121, D22, D32, D42, D52) in which only the one specific symbol C0 is included and in which the specific symbol C0 is arranged around the start guide Gus. In this way, it is possible to easily find the start guide Gus. It is possible to prevent the user from unsatisfactorily feeling that it is difficult to find the position of the start guide Gus.

When the release symbols (Oc1, Oc2, Oc3) include a plurality of symbols which are the same as the specific symbol C0, the image generation portion 802 recognizes the same symbol number that is the number of symbols which are included in the release symbols and which are the same as the specific symbol C0. The image generation portion 802 generates the lock release screen (D12, D121, D22, D32, D42, D52) in which only the same number of specific symbols as the same symbol number are included and in which the release symbols are arranged around the start guide Gus. In this way, it is possible to include only the necessary number of specific symbols C0 in the lock release screen.

The touch screen 81 receives the operation of selecting the specific symbol C0. The image generation portion 802 recognizes the specific symbol C0 based on the selection operation on the touch screen 81. In this way, it is possible to set a desired symbol to the specific symbol C0.

The image generation portion 802 recognizes the first specific symbol C1 and the second specific symbol C2 among the symbols included in the release symbols (Oc1, Oc2, Oc3). The image generation portion 802 generates the lock release screen (D12, D121, D22, D32, D42, D52) in which only the one specific symbol arrangement part C3 where the first specific symbol C1 and the second specific symbol C2 are adjacent to each other is included and in which the first specific symbol C1 and the second specific symbol C2 are arranged around the start guide Gus. In this way, it is possible to include only one combination of the specific symbols in the lock release screen. It is possible to easily find the start guide Gus.

The touch screen 81 receives the operation of selecting the first specific symbol C1 and the second specific symbol C2. The image generation portion 802 recognizes the first specific symbol C1 and the second specific symbol C2 based on the selection operation on the touch screen 81. In this way, it is possible to set desired symbols to the first specific symbol C1 and the second specific symbol C2.

The image forming apparatus (the multifunction peripheral 100) includes: the print portion 2 which forms an image on the sheet; the control portion 1; and the touch operation device 8 described above. The control portion 1 controls the print portion 2 based on the touch operation in the touch operation device 8.

The present disclosure can also be regarded as a method of releasing the lock state of the touch operation device 8. The lock release method includes: generating the lock release screen for the lock release; displaying the generated lock release screen; detecting the touch operation; storing the release pattern which is previously registered and the release symbols in which a plurality of symbols are combined; including a plurality of guides in the lock release screen; arranging the guides according to the predetermined rule; including a plurality of symbols in the lock release screen; arranging the symbols around the guides at regular intervals; including one of the guides which is set to the start guide Gus in the lock release screen; generating the lock release screen in which the release symbols are arranged around the start guide Gus; acquiring the input pattern which is the trace of the touch operation of connecting the guides together; and releasing the lock state when it is confirmed that in the input pattern, the guide on which the touch operation is first performed agrees with the start guide Gus and that the shape of the input pattern agrees with the shape of the release pattern.

Although the embodiment of the present disclosure is described above, the scope of the present disclosure is not limited to the embodiment, and various modifications are added and can be practiced without departing from the spirit of the disclosure.

The present disclosure can be utilized for a touch operation device which includes an operation panel of an electronic device or a touch screen of a portable information terminal or the like.

What is claimed is:

1. A touch operation device comprising:
a lock control portion which controls an operation of lock state and lock release that is a predetermined function;
a computation processing unit, which generates a lock release screen for the lock release;
a touch screen which displays the generated lock release screen and which can detect a touch operation; and
a storage portion that stores a release pattern which is previously registered and release symbols in which a plurality of previously selected symbols are combined,
wherein the computation processing unit
includes a plurality of guides in the lock release screen,
arranges the guides according to a predetermined rule,
in the lock release screen, a plurality of guides are arranged and a plurality of symbols including the release symbols and at least part of dummy symbols, which are symbols other than the release symbols, are arranged at positions that do not overlap the plurality of guides in the lock release screen,
arranges the symbols around the guides at regular intervals,
includes one of the guides which is set to a start guide in the lock release screen and
generates the lock release screen in which the release symbols are arranged around the start guide, and
the lock control portion
acquires an input pattern which is a trace of the touch operation of connecting the guides together and
releases the lock state when the lock control portion confirms that in the input pattern, the guide on which the touch operation is first performed agrees with the start guide and that a shape of the input pattern agrees with a shape of the release pattern.

2. The touch operation device according to claim 1, wherein the computation processing unit newly generates the lock release screen in which a position of the start guide is set to a different position each time the lock release screen is displayed on the touch screen.

3. The touch operation device according to claim 1, wherein an order in which the symbols included in the release symbols are arranged is determined, and the computation processing unit generates the lock release screen in which the start guide is surrounded by the release symbols in the order of the arrangement that is determined.

4. The touch operation device according to claim 1, wherein when the lock control portion detects the touch operation after the lock release screen is displayed, the computation processing unit does not display all the symbols included in the lock release screen.

5. The touch operation device according to claim 1, wherein the computation processing unit generates the lock release screen in which the guides are disposed in an arrangement that is determined according to a number of the symbols included in the release symbols.

6. The touch operation device according to claim 1, wherein the release symbols include a plurality of symbols and a character.

7. The touch operation device according to claim 1, wherein the release symbols include a plurality of symbols and a digit.

8. The touch operation device according to claim 1, wherein the computation processing unit
recognizes a specific symbol selected by a user via the touch screen and which is any one of the symbols included in the release symbols and generates the lock release screen in which only the one specific symbol is included and in which the specific symbol is arranged around the start guide.

9. The touch operation device according to claim 8, wherein when the release symbols include a plurality of symbols which are same as the specific symbol, the computation processing unit recognizes a same symbol number that is a number of the symbols which are included in the release symbols and which are the same as the specific symbol and generates the lock release screen in which only a same number of the specific symbols as the same symbol number are included and in which the release symbols are arranged around the start guide.

10. The touch operation device according to claim 8, wherein the touch screen receives an operation of selecting the specific symbol, and the computation processing unit recognizes the specific symbol based on the selection operation on the touch screen.

11. The touch operation device according to claim 1, wherein the computation processing unit recognizes a first specific symbol and a second specific symbol among the symbols included in the release symbols and generates the lock release screen in which only one specific symbol arrangement portion where the first specific symbol and the second specific symbol are adjacent to each other is included and in which the first specific symbol and the second specific symbol are arranged around the start guide.

12. The touch operation device according to claim 11, wherein the touch screen receives an operation of selecting the first specific symbol and the second specific symbol, and the computation processing unit recognizes the first specific symbol and the second specific symbol based on the selection operation on the touch screen.

13. An image forming apparatus comprising:

an image formation portion which forms a toner image based on the image data and which transfers the toner image to the sheet;

a control portion; and the touch operation device according to claim 1, wherein the touch operation device controls the image formation portion based on the touch operation.

\* \* \* \* \*